Aug. 10, 1954  E. H. HARTEL  2,685,932
CONSTANT SPEED CONTROL MEANS FOR VARIABLE PITCH PROPELLERS
Filed Jan. 6, 1949  7 Sheets-Sheet 4
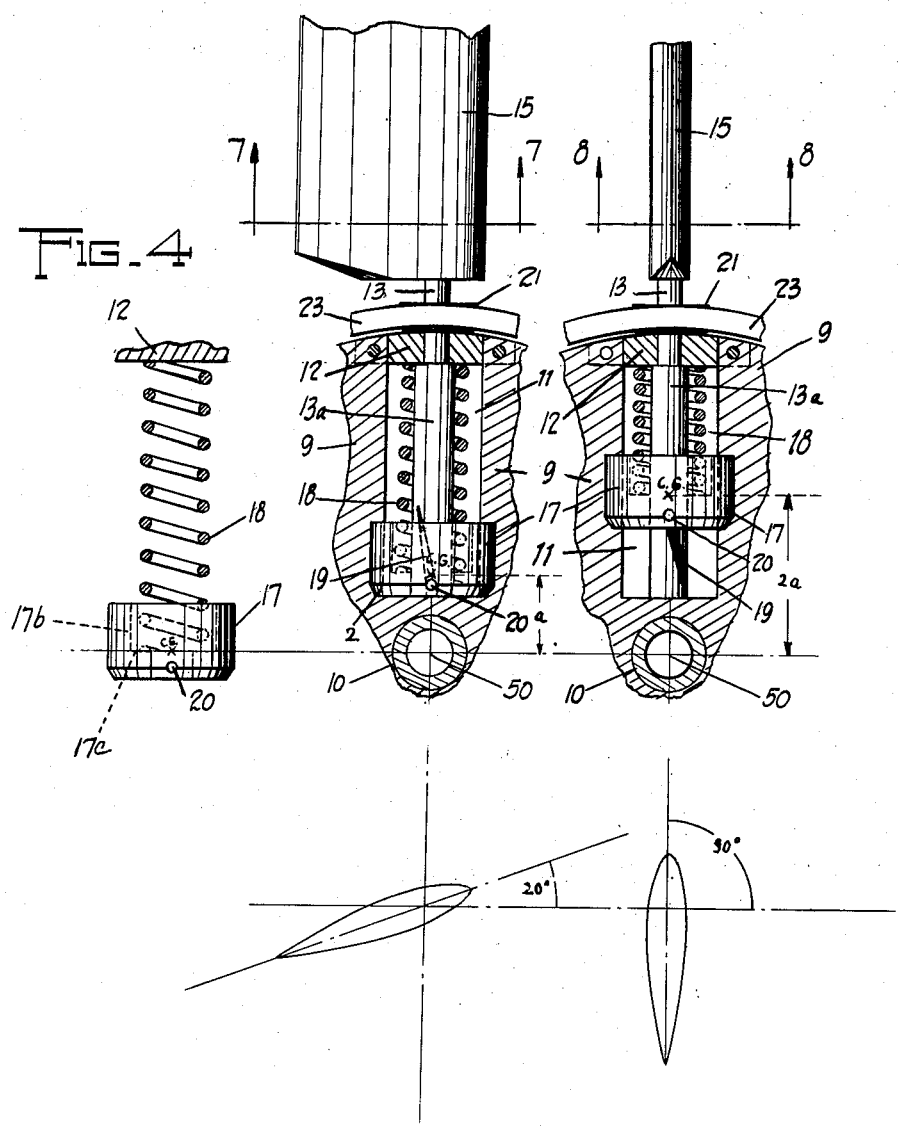
INVENTOR.
Erwin H. Hartel
BY Robb & Robb
Attorneys.

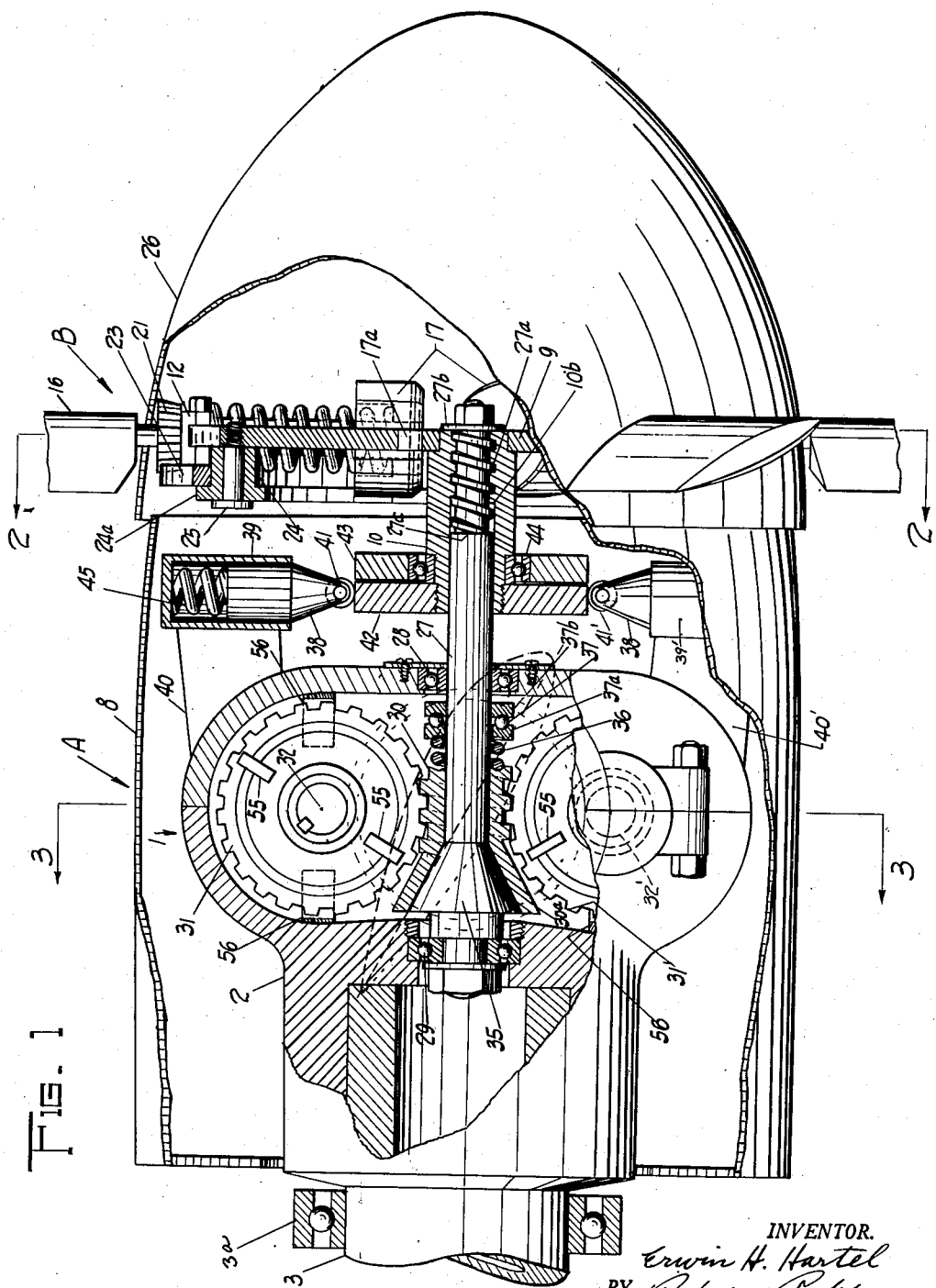

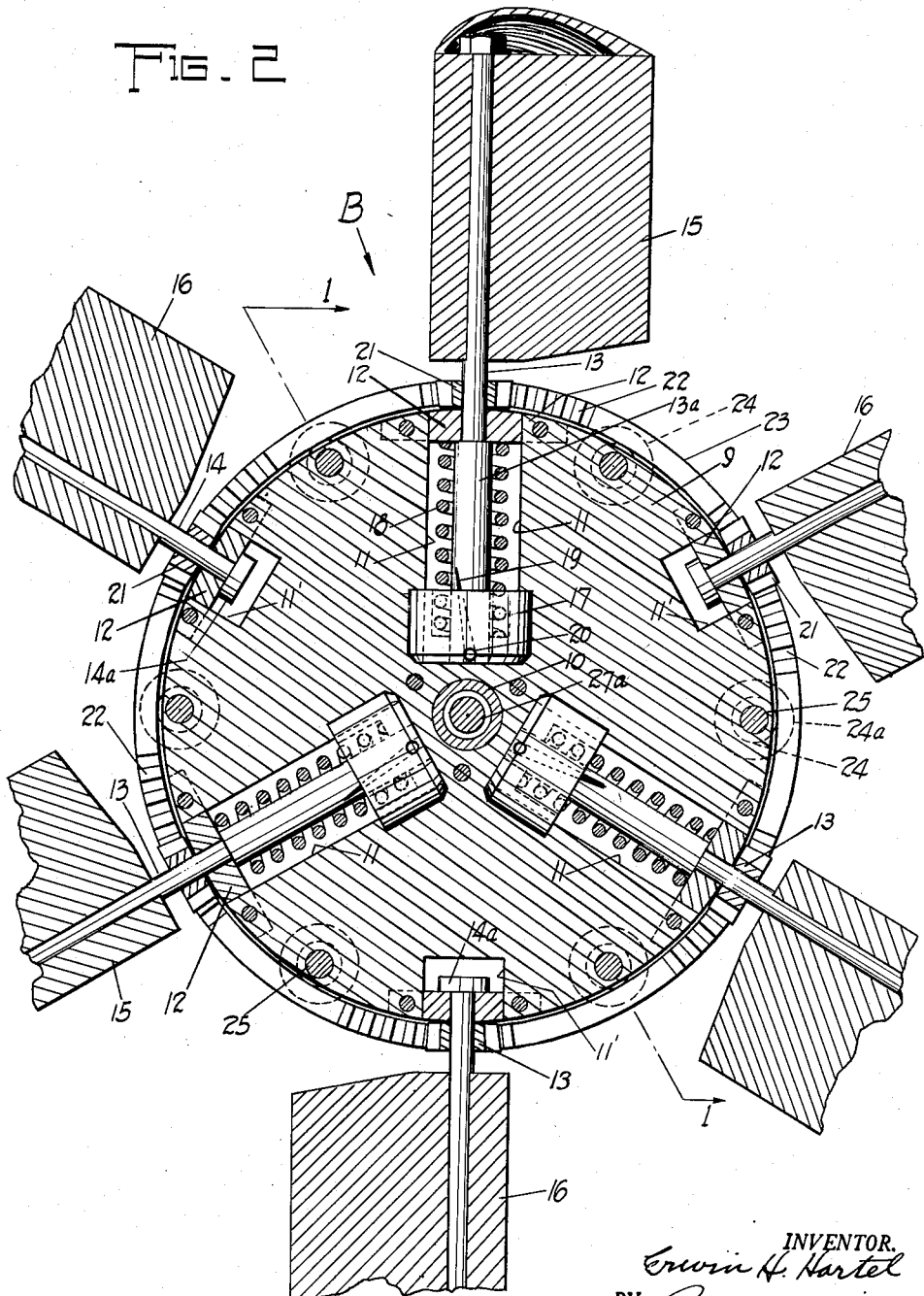

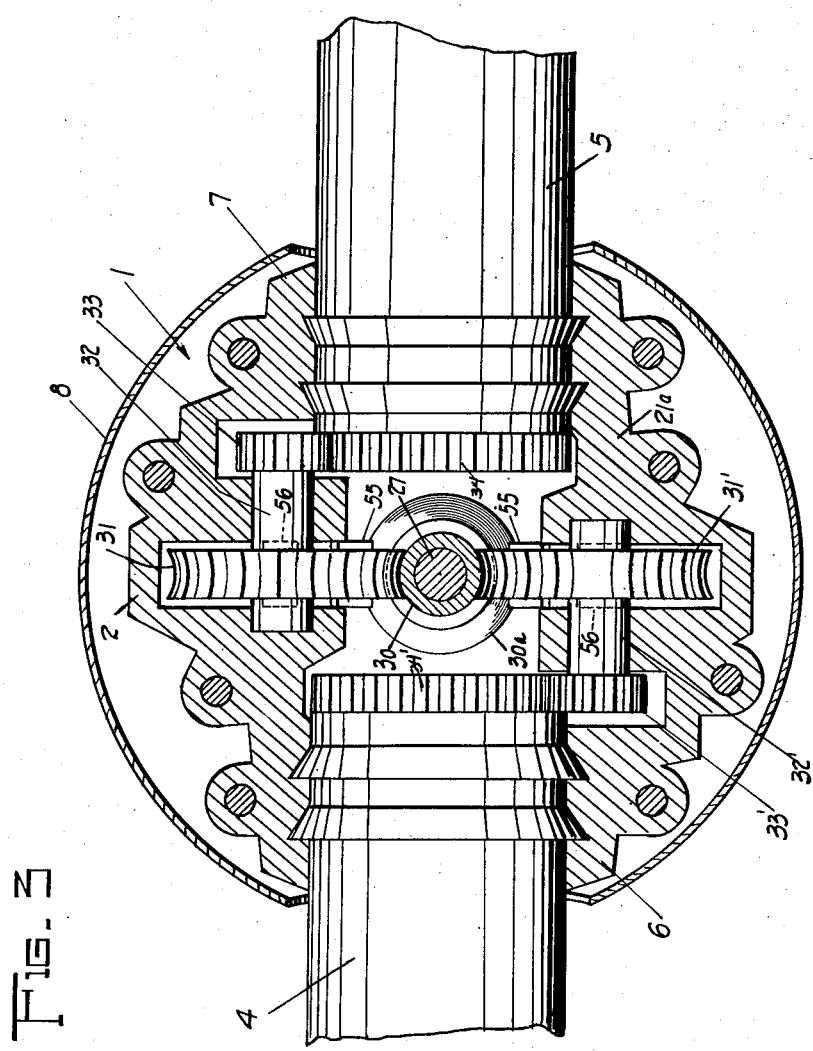

Aug. 10, 1954     E. H. HARTEL     2,685,932
CONSTANT SPEED CONTROL MEANS FOR VARIABLE PITCH PROPELLERS
Filed Jan. 6, 1949     7 Sheets-Sheet 5

INVENTOR.
Erwin H. Hartel
BY
Attorneys

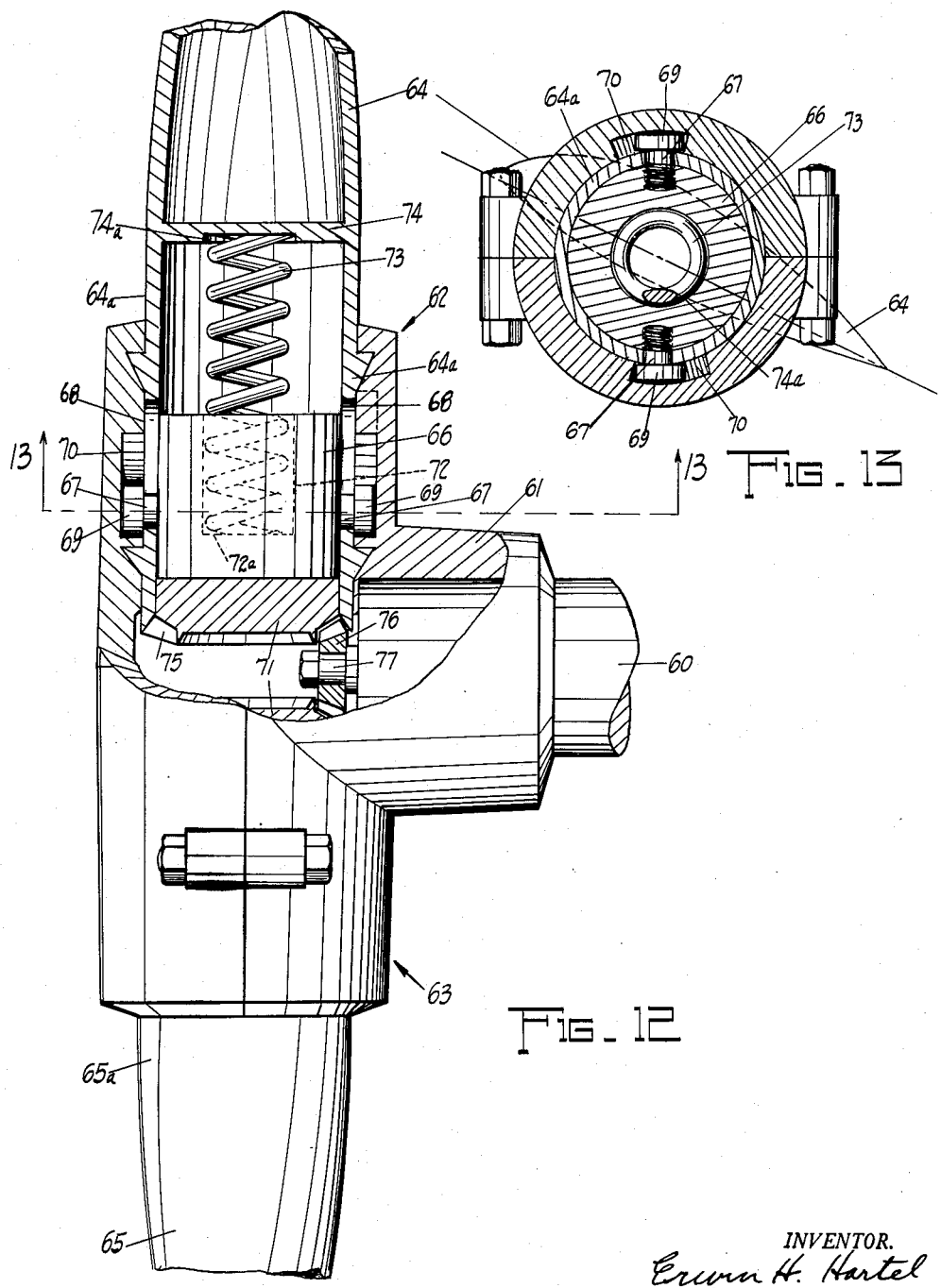

Aug. 10, 1954 E. H. HARTEL 2,685,932
CONSTANT SPEED CONTROL MEANS FOR VARIABLE PITCH PROPELLERS
Filed Jan. 6, 1949 7 Sheets-Sheet 7
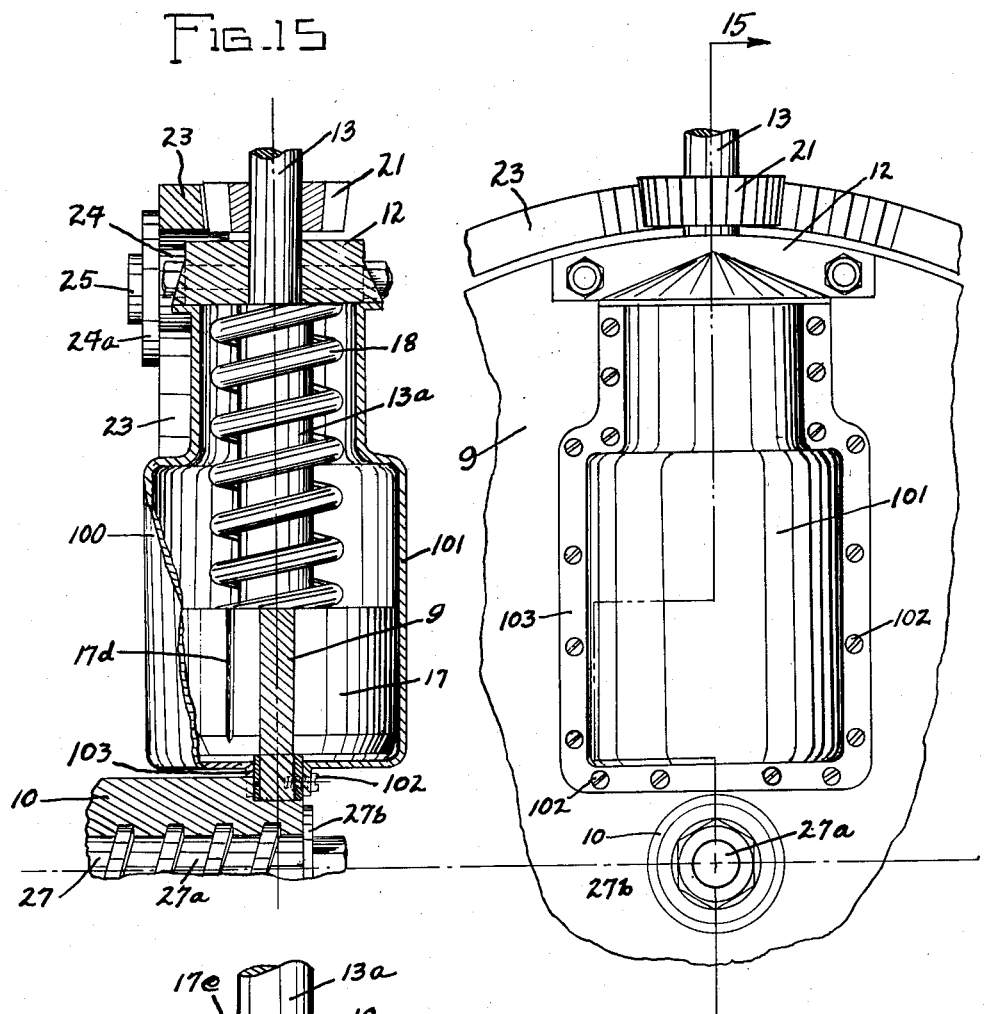
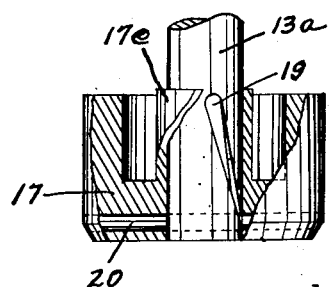
INVENTOR.
Erwin H. Hartel
BY Robb & Robb
Attorneys Patented Aug. 10, 1954

2,685,932

UNITED STATES PATENT OFFICE 2,685,932

CONSTANT SPEED CONTROL MEANS FOR VARIABLE PITCH PROPELLERS

Erwin H. Hartel, Cleveland, Ohio

Application January 6, 1949, Serial No. 69,471

27 Claims. (Cl. 170—160.17)

This application is a continuation in part of my co-pending application, Serial No. 35,143, filed June 25, 1948, now abandoned, for Constant Speed Control Means for Variable Pitch Propellers.

This invention appertains to speed control means, and more particularly to control means for maintaining constant speed of the rotating member, especially adapted in the art of aircraft for maintaining constant speed of a variable pitch propeller.

An engine driving a propeller should preferably operate uniformly so that the propeller driving shaft rotates at a constant or uniform speed for which it is especially designed, under usual conditions, as ordinarily that is the speed at which the engine operates most efficiently. In order to maintain the propeller rotating at a constant speed it is necessary to vary the pitch of the propeller blades in accordance with varying conditions of different air speeds and air density.

The energy absorbed by a rotating propeller having radial blades depends largely upon the pitch of the blades and the power required by the propeller to drive it at a given speed increases with the increase of pitch of the propeller blades. If the pitch of the propeller blades initially is high at commencement of rotation, the resistance thereto will be greater and a greater load will be put upon the engine, with the consequence that it will take a certain high plane speed for the propeller driving shaft to reach its normal most efficient or constant operating speed. It is therefore desirable that the propeller blade should have low pitch when starting in order that the propeller shaft of the engine will reach its most efficient operating or constant speed at low plane speed. It is also desirable that when the airplane is coming in for a landing and the engine is running at relatively low speed, the pitch of the propeller blade should be low so that in the event the engine speed needs to be increased quickly for emergency power, the propeller pitch should be at a minimum to reduce the resistance thereof to attaining high speed rapidly if the condition warrants.

When the airplane is cruising, the engine will normally be operated at its constant speed, and it is, of course, desirable to provide for automatic variation of propeller pitch to maintain such constant speed of the propeller driving shaft, such means enabling the pitch of the blades to vary in accordance with the density of the air at flying levels of the aircraft and in accordance with airplane speed, so that if the air density increases or the plane speed decreases, the pitch of the propeller blades will automatically be decreased, and if the air becomes more rarified, or the plane speed increases, the pitch of the propeller blade will automatically be increased to meet this condition. Thus the engine will constantly operate at its most efficient uniform or constant speed.

With the foregoing general requirements in mind, my invention aims to provide control means for automatically controlling the pitch of the engine driven propeller blades to meet the requirements of all conditions in the operation of an airplane from starting of the engine through initial forward movement of the airplane, takeoff, climbing, cruising, and landing.

In its general aspects my invention aims to provide such control means which takes account of the desirability of maintaining the pitch of the propeller blades at low pitch at the time of the starting of the motor, and warming up of the motor, and until the speed of the airplane reaches a certain speed for take-off, so that the propeller driving shaft can reach its normal most efficient or constant speed of rotation as quickly as possible, and at low airplane speed.

My invention further takes account of the desirability of decreasing the pitch of the propeller blades to their minimum pitch as rapidly as possible when the speed of the engine is suddenly decreased after the propeller has been rotating at higher speed with the blades at higher pitch.

In carrying my invention into practice, I contemplate the provision of a control device designed to be mounted for rotation about an axis concentric with the axis of rotation of the propeller or the driving shaft of the latter, the provision of instrumentalities for causing rotation of said control device under the influence of air stream movement independently of the propeller; the provision of other instrumentalities for effectuating direct connection of the control device with the propeller for causing rotation of the two together, said latter devices being automatically operable for this purpose; and the provision of instrumentalities associated with said control device and with said propeller for changing the pitch of the propeller blades pursuant to a difference in speed of rotation of the control device from the speed of rotation of the propeller.

In accordance with my invention, I contemplate the provision of a control device including a rotatable member having centrifugal elements associated therewith for movement radially thereof, resilient elements opposing radial outward movement of the centrifugal elements, and vane or blade elements associated with the rotatable member for rotation about the respective blade axes for changing the pitch of the blade elements, and means associated with the blade elements and centrifugal elements, for rotating the blade element about its axis upon outward radial movement or inward radial movement of the centrifugal element, for changing the pitch of the blade elements.

In accordance with my invention, the instrumentalities for interconnecting the control device for direct rotation with the propeller include means operable by centrifugal force for automatically effectuating direct connection between the control device and the propeller and for causing release of said connection.

Another feature of my invention involves the provision, in connection with the operating instrumentalities for effectuating propeller pitch change when a difference occurs between the speed of rotation of the control device and the speed of rotation of the propeller, of means for absorbing shock in said operating instrumentalities to prevent damage when parts of those instrumentalities reach certain limits of movement, said means effecting yieldable and resilient frictional connection between said operating parts of the operating instrumentalities.

Another feature of my invention involves a special relationship between the centrifugal elements and resilient elements opposing radial outward movement thereof, whereby, at a certain rotational speed of the rotatable member carrying said elements, equality exists between the opposing forces thereof, irrespective of radial positioning of the centrifugal elements.

Another feature of my invention involves the provision of means cooperative with the centrifugal elements for coordinating the speed of radial movement thereof with the rate of acceleration and deceleration of the rotatable member carrying said elements whereby to prevent overcorrection of the rotational speed of the rotatable member.

Still another feature of my invention involves the provision of means for dampening the radial movement of the centrifugal elements relative to the rotatable member, said means utilizing lubricating oil as the dampening medium whereby to lubricate the centrifugal elements and associated mechanism.

In the drawings:

Figure 1 is a view showing a propeller mechanism embodying my invention, the said view showing a propeller head, including the propeller blades and the pitch changing mechanism, mounted on the forward end of the propeller drive shaft, and showing the control device mounted for rotation on an axis concentric with the propeller drive shaft in front of the propeller, and also showing the various instrumentalities interassociating said control device with said propeller head, portions of the propeller head housing and control device housing being shown broken away and certain parts being shown in section, about on the lines 1—1 of Figure 2.

Figure 2 is a section taken on the line 2—2 of Figure 1, illustrating details of the control device.

Figure 3 is a section taken on the line 3—3 of Figure 1, and showing more particularly details of the propeller pitch changing mechanism associated with the propeller blades.

Figure 4 is a diagrammatic view of the centrifugal element and associated yieldable or resilient element, illustrating principles of operation.

Figures 5 and 6 are similar views showing a portion of the control device including the centrifugal element and associated yieldable or resilient element, and their associated control vane, Figure 6 illustrating certain of the parts in a different position from that shown in Figure 5, these views being taken as if looking from the rear of Figure 2.

Figure 7 is a diagrammatic view illustrating the pitch of the control vane of Figure 5, the view illustrating the vane as if the section had been taken on the line 7—7 of Figure 5.

Figure 8 is a view similar to Figure 7, but illustrating the control vane as if the section had been taken on the line 8—8 of Figure 6.

Figure 12 is a sectional view through a two-bladed propeller illustrating a modification of my invention.

Figure 13 is a sectional view substantially on the line 13—13 of Figure 12.

Figure 14 is an enlarged detail, in front elevation, of a portion of the control device illustrating a modification of the invention.

Figure 15 is a sectional view substantially on the line 15—15 of Figure 14.

Figure 16 is a detail sectional view of a portion of the structure of Figures 14 and 15.

Figure 9:
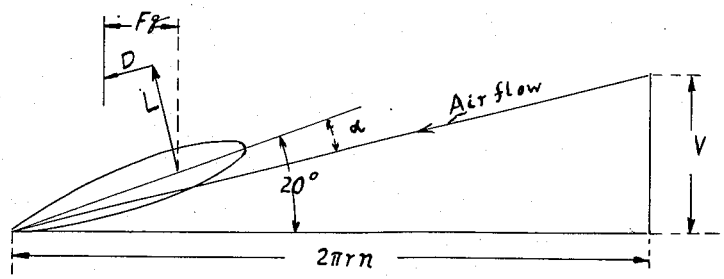
Figures 9 and 10 are diagrammatic views illustrating the forces acting on the control vane at different air speeds.

In Figures 1 to 11 inclusive I have shown a propeller A and control device B therefor, embodying my invention, said propeller and control device being adapted to be mounted on an airplane. In these views the control device B is carried by the propeller A which is mounted on the propeller shaft 3 for rotation therewith. The shaft 3 is a driving shaft operatively connected with the airplane engine (not shown) and said shaft 3 is rotatably mounted in a bearing 3a mounted upon and forming a part of the aircraft and thus serving as supporting means for both the propeller A and the control device B.

Now describing the invention and referring first to Figures 1, 2, and 3, the propeller mechanism there illustrated comprises the propeller head generally indicated by the letter A, and the control device generally indicated by the letter B, together with their associated instrumentalities which will be described. The propeller head A generally consists of a two-part casting 1 comprising a housing for the propeller blade pitch changing mechanism and a hub for the propeller blade, as best seen in Figure 3. The hub portion 2 is mounted on the propeller drive shaft 3 and suitably fixed thereto for rotation therewith, as seen in Figure 1. The propeller blades 4 and 5 are mounted on the propeller head in opposed relation, the inner ends of the blades 4 and 5 being received, respectively, in hub portions 6 and 7 of the propeller casting 1 for rotation of the blades 4 and 5 about their respective axes concentric with one another within the hub portions 6 and 7. The blades 4 and 5 are interconnected by suitable gearing, later to be described, for effecting rotation of the blades 4 and 5 in opposite directions about their axes and in unison for changing the pitch of the blades.

The propeller head A is provided with a suitable streamlined outer shell indicated by the numeral 8.

Now referring to the control device generally indicated by the letter B, the same comprises a circular disc 9 apertured at its center to receive the hub 10 suitably bolted thereto. The disc 9 is provided with a plurality of radial slots 11 and 11' the outer ends of which are closed by blocks or plates 12 forming bearings for the blade shafts 13 or 14 carrying the blades 15 or 16 arranged alternately equidistantly radially of the disc 9. The shaft 14 for each of the blades 16 have enlarged portions 14a disposed radially inwardly of the respective blocks or backing plates 12 and bearing thereagainst for retaining the blades 16 in proper position radially of the disc 9.

The shafts 13 for the blades or vanes 15 have enlarged portions 13a which extend the full length of the slots 11 and the outer shoulders of which bear against a block or backing plate 12, and the inner ends of which bear against the disc 9 at the inner ends of the slots 11, as seen best in Figure 6. Each of the shaft portions 13a has associated therewith a centrifugally responsive element or weight 17 having a central bore receiving the enlarged shaft portion 13a for sliding movement of the element 17 axially thereof. Each of the centrifugal elements 17 has guide grooves 17a at opposite sides thereof receiving portions of the disc 9 at opposite sides of the slots 11 for guiding the centrifugal elements 17 in their movement radially of the disc 9 and preventing rotation of the elements 17, relative to the disc 9. Each of the centrifugal elements 17 has a counter-bore 17b serving as a socket for receiving the inner end of the spring 18 which encircles the enlarged portion 13a of the shaft 13, the outer end of which spring bears against the backing plate 12. The springs 18 are designed to yieldably resist the radial outward movement of the centrifugal elements 17 due to centrifugal force during rotation of the disc 9.

Each of the shaft portions 13a has a helical groove 19 extending from the inner end of the shaft to a point intermediate the ends of the enlarged shaft portion 13a, each of said grooves 19 receiving a respective pin 20 fixed to the centrifugal element 17, whereby radial movement of the centrifugal element 17 relative to the disc 9 will cause rotation of the shaft 14 and thereby change the pitch of the vane 15.

The blades or vanes 15 and 16 of the control device are all, of course, in the same phase of pitch, and, in order to maintain this condition at all times the shafts of the blades or vanes 15 and 16 are interconnected for rotation in unison by the provision of a respective pinion 21 meshing with a respective toothed portion 22 of a ring gear 23 mounted for rotation relative to the disc 9 upon rollers 24 rotatably mounted upon flanged studs 25 carried by the disc 9. The rollers 24 are flanged as at 24a, see Figures 1 and 2, and the flanges 24a engage the ring 23 rearwardly thereof for retaining the same rotatably on the disc 9.

The control device B, above described, is substantially entirely enclosed in a streamlined shell 26 except that portions of the shafts 13 and 14 protrude therethrough so that the blades 15 and 16 are disposed outwardly thereof.

The hub 10 of the control disc 9 is rotatably mounted on the outer end of a shaft 27 which is concentric or axially alined with the axis of the propeller driving shaft 3, the shaft 27 being mounted in bearings 28, 29 carried by the castings 1 forming part of the propeller head A. The forward end of the shaft 27 is provided with a screw thread 27a and the bore of the hub 10 is correspondingly threaded for screw cooperation therewith. Rotation of the control disc 9 relative to the shaft 27 will cause movement of the entire control device B axially of the shaft 27 forwardly or rearwardly thereof, depending upon the direction of rotation of the disc 9 relative to the shaft 27, for the length of the thread 27a.

Loosely mounted on the shaft 27 for rotation relative thereto is a worm sleeve 30, the worm thread of which meshes with the gears 31 and 31'. As seen best in Figures 1 and 3, the gear 31 is keyed to a countershaft 32 having keyed thereto a pinion 33 meshing with pinion 34 fixed to the inner end or base of the propeller blade 5. Similarly, the gear 31' is keyed to a countershaft 32' having a pinion 33' keyed thereto and meshing with a pinion 34' fixed to the inner end or base of the propeller blade 4. The gearing just described running from the worm 30 to the propeller blades 4 and 5 comprise parts of the instrumentalities for causing rotation of the propeller blades 4 and 5 about their axes to change the pitch thereof and operate to rotate the propeller blades 4 and 5 in opposite directions of rotation about their respective axes and to maintain these blades 4 and 5 always in the same phase of pitch.

The worm sleeve 30 is formed at its rear end with a hollow cone portion 30a within which is received the cone element 35 fixed to the shaft 27. The worm sleeve 30 is resiliently pressed axially rearwardly of the shaft 27 so that the cone element 35 is frictionally engaged with the cone portion 30a by means of the spring 36 interposed between the worm sleeve 30 and the freely rotatable race 37a of a thrust bearing 37, the outer race 37b of which is directly carried on the shaft 27 in fixed position thereon. It will be apparent that with this construction one end of the spring 36 bearing against the worm sleeve 30, the other end of the spring bearing against the freely rotatable race 37a of the bearing 37, the spring 36 and worm sleeve 30 may rotate relatively to the shaft 27 while at the same time the cone portion 30a is pressed into frictional engagement with the cone element 35 whereby a yieldable connection between the worm sleeve 30 and the shaft 27 is effected for enabling rotation of the shaft 27 to cause rotation of the worm sleeve 30 under normal conditions.

As seen best in Figure 1, centrifugal brake instrumentalities are provided for directly connecting the propeller head 1 with the control disc 9 for rotation of the latter in positive connection with the propeller head 1 under certain conditions. These centrifugal brake instrumentalities comprise centrifugal brake elements or weights 38 and 38' in the form of pistons slidable in cylinders 39 and 39', the axes of which are disposed radially of the shaft 27 so that the centrifugal piston brake elements 38 and 38' are reciprocally movable in said cylinders radially of the axis of the shaft 27. The cylinders 39 and 39' are carried by arms 40 and 40' secured to the gear casting 1 of the propeller head A. The centrifugal brake elements 38 and 38' are provided with rollers 41 and 41' engageable with the periphery of a disc 42 secured to the hub 10 of the control disc 9. Said hub 10 also carries a freely rotatable disc 43 mounted on ball bearings 44 for free rotation relative to the hub 10. The centrifugal brake elements 38 and 38' are pressed radially inwardly toward the axis of the shaft 27 by means of springs 45 disposed in the cylinders 39 and 39' and acting upon the centrifugal brake elements 38 and 38' in opposition to the action of centrifugal force thereof during rotation of the propeller head A.

In Figure 1 the disposition of the control disc 9 axially of the shaft 27 is such that the disc 42 is positioned for engagement with the roller members 41 and 41' of the centrifugal brake elements 38 and 38'. It will be understood, however, that rotation of the control disc 9 relative to the shaft 27 to move the control disc 9 axially rearwardly of the shaft will bring the freely rotatable disc 43 into position for engagement thereof with the rollers 41 and 41'. Engagement of the rollers 41 and 41' with the disc 43 will not, of course, afford and positive connection between the propeller head A and the control device B, so that under such condition the propeller head A and the control device B may each rotate relatively to one another.

For a full understanding of the interaction of the centrifugal elements 17 and the springs 18, reference is now made to Figures 2, 4, 5, and 6 particularly. In Figure 4 the spring 18 is diagrammatically represented as if its opposite ends were in engagement respectively with the block or backing plate 12 and the centrifugal elements 17, but with no external pressure applied to the spring 18, and under this condition the spring is not applying any force to the elements 12 and 17. The diagrammatic showing of Figure 4 represents the centrifugal element 17 as if its center of gravity "x" were positioned at the center of rotation, indicated by the line 50, of the control disc 9. The shoulder or seat 17c provided at the inner end of the counterbore 17b for seating the end of the spring 18 engaging the centrifugal member 17 is disposed so that the end of the spring engages the centrifugal element 17 at its center of gravity "x," and in Figure 4 this is represented at the center of rotation 50 of the disc 9. In Figure 5 the centrifugal element 17 and the spring 18 are shown in their normal disposition as when the disc 9 is at rest, the centrifugal element 17 being positioned at the inner end of the radial slot 11 at its extreme limit of movement radially inwardly toward the center of rotation. Under such condition the center of gravity "x" of the centrifugal element 17 is disposed radially outwardly from the center of rotation 50 by the distance $a$ and correspondingly the spring 18 has been compressed the same distance. In Figure 6 the centrifugal element 17 and the spring 18 are shown as when the element 17 has been moved outwardly radially a distance $2a$ from the center of rotation 50. The spring is compressed the same distance, and is thus pressed with twice the force with which it was pressed under the condition illustrated by Figure 5, since the produced force of the spring 18 is proportional to distance by which it is stressed (in this case compressed). In the operation of the device, of course, the weight 17 moves outwardly to the position illustrated by Figure 6 under the action of centrifugal force only when the disc 9 is rotating above constant speed. In the rotation of the disc 9 the centrifugal force produced by the element 17 at the position shown in Figure 6 is twice the centrifugal force produced by the element when in the position of Figure 5 since the centrifugal force of the element 17 is proportional to its radius of rotation.

The arrangement of the spring 18 is such that its axis extends radially of the center or axis of rotation of the disc 9 and the spring 18 is disposed so that its radially inner end would lie at the center or axis of rotation with the spring 18 in unstressed condition. Thus the spring 18 is arranged so that it is stressed by a force initially applied thereto at the center or axis of rotation and acting upon the spring 18 from the center or axis of rotation radially outwardly therefrom.

The centrifugal element 17 is arranged for movement radially of the disc 9 along the axis of the spring 18, and the element 17 is disposed so that it engages the radially inner end of spring 18 at the center of gravity of the element 17. Thus the relation of the parts 17 and 18 is such that the radius of rotation of centrifugal element 17 is the distance by which the spring 18 is compressed along its axis of length. This relationship always exists irrespective of the radial position of the element 17.

In view of the initial compressed condition of spring 18 it has a force opposing radial outward movement of the centrifugal element 17. The spring force will exceed the centrifugal force of the element 17 until disc 9 attains a certain rotational speed, at which rotational speed the centrifugal force of the element 17 will equal force of the spring 18, and at rotational speeds above said certain rotational speed, the centrifugal force of the element 17 will exceed the force of the spring 18.

*Operation of control device*

The centrifugal element 17 and the spring 18 are calibrated so that the produced force of the spring 18 (due to compression thereof) opposing radial movement of the centrifugal element 17 outwardly of the disc 9 equals the centrifugal force of the element 17 at a predetermined speed of rotation of the disc 9, which predetermined speed of rotation is the constant speed at which it is desired to cause the propeller shaft 3 to rotate for uniform operation.

In view of the foregoing calibration of the centrifugal element 17 and the spring 18, the produced force of the spring 18 exceeds the centrifugal force of the element 17 at any speed of rotation of the disc 9 below the said predetermined constant speed of rotation. Consequently, the centrifugal element 17 will not move outwardly radially of the disc 9 from the position shown in Figures 2 and 5 until the speed of rotation of the disc 9 exceeds the predetermined constant speed, while the control vanes 15 and 16 are at their minimum pitch of 20° e. g., see Figure 7.

The control vanes 15 and 16 are designed to cause rotation of the control disc 9 at constant speed at a predetermined speed of the air stream acting upon the vanes 15 and 16 to cause rotation of the disc 9 when the vanes 15 and 16 are at their minimum pitch of 20°. For example, in the use of the construction illustrated in Figure 1, the control disc 9 may be designed to attain a constant rotational speed of, for example, 32 R. P. S. when the plane upon which the control is mounted is traveling at an air speed of 32 miles per hour, see Figure 11. The said constant speed of rotation of the disc 9 will be attained at the predetermined air speed when the vanes 15 and 16 are at their minimum pitch of 20°.

Now it will be understood from the foregoing that since the control disc 9 may attain its constant rotational speed of 32 R. P. S. at an air speed of 32 miles per hour with the vanes 15 and 16 at minimum pitch of 20°, there will be no outward movement of the centrifugal element 17 radially of the disc 9 until the air speed of the airplane exceeds the predetermined air speed of 32 miles per hour, tending to cause the disc 9 to rotate faster than the predetermined constant speed of 32 R. P. S. while the vanes 15 and 16 remain at their minimum pitch of 20°. Now bearing in mind that the produced force of the spring 18 exceeds the centrifugal force of the element 17 when the rotational speed of the disc 9 is below constant speed and that the spring force equals the centrifugal force of the element 17 at the predetermined constant speed of rotation of the disc 9 and that the centrifugal force of the element 17 exceeds the spring force of the spring 18 when the disc 9 rotates faster than the predetermined constant speed, it will be understood that there will be no radial outward movement of the element 17 from the position shown in Figures 2 and 5 until the air speed exceeds 32 miles per hour, tending to rotate the control disc 9 faster than the predetermined constant speed of 32 R. P. S. while the control vanes 15 and 16 are at minimum pitch of 20°.

Thus the operation of the control device is such that it attains its predetermined constant speed (for example 32 R. P. S.) at a predetermined minimum air speed (for example 32 miles per hour) acting upon the control vanes to cause rotation of the control disc 9 while the control vanes are at minimum pitch (for example 20°).

When the predetermined minimum air speed (for example 32 miles per hour) is exceeded, this tends to cause rotation of the disc 9 to exceed its predetermined constant rotational speed. The centrifugal force of the element 17 at this point exceeds the opposing force of the spring 18 so that the element 17 tends to move radially outwardly of the disc 9. Radial outward movement of the element 17 increases the pitch of the vanes 15 and 16 due to the action of pin 20 in helical slot 19 causing counterclockwise rotation of the vanes, referring to Figure 7, about the axes of their shafts 13 and 14. Increasing the pitch of the vanes 15 and 16 decreases the angle of attack of the air stream upon them, thus decreasing the torque force, causing rotation of the disc 9 and that results in decreasing the rotation of the disc 9 toward constant speed.

As the rotation of the disc 9 decreases to constant speed, the element 17 will move radially inwardly of the disc 9 slightly, decreasing the pitch of the vanes 15 and 16 and increasing the angle of attack of the air stream upon the vanes, which, in turn, increases the torque force tending to rotate the disc 9, which acts to stop the decrease of rotation of the disc 9 when the constant rotational speed thereof is again attained. It will be understood, of course, that radial inward movement of the element 17 causes clockwise rotation of the vanes, referring to Figure 7, about the axes of their vane shafts 13 and 14.

When the disc 9 is brought back to its predetermined constant rotational speed from a higher speed in the manner just described, the disc 9 will thenceforth continue to rotate at the constant speed so long as the particular air speed (above the predetermined minimum air speed) is maintained. It will be understood also that under this condition of air speed higher than the predetermined minimum air speed, the disc 9 rotating at constant speed, the particular radial position of the element 17 appropriate to the new assumed pitch angle of the vanes 15 and 16 will be maintained until the further change in air speed occurs tending to cause variation in the rotational speed of the disc 9 from the predetermined constant speed.

Thus it will be seen that for every given air speed to which the control device is subjected above the predetermined minimum air speed, the control vanes 15 and 16 will assume a certain position of higher pitch necessary to produce the torque force required to rotate the disc 9 at the constant speed for the given air speed, and the element 17 will have a corresponding radial position which will be maintained as long as the disc rotates at constant speed and the air speed continues at that particular higher speed.

Irrespective of the radial position of the element 17 relative to the disc 9, the centrifugal force of the element 17 will equal the opposing force of the spring 18 so long as the disc 9 rotates at the predetermined constant speed. For explanation, reference is again made to Figures 5 and 6. In Figure 5 the centrifugal force of the element 17 and the opposing force of the spring 18 were equal when the disc rotated at constant speed, the element 17 remaining at its extreme inward radial position in respect to the disc 9. In Figure 6, with the disc 9 still rotating at its predetermined constant rotational speed, the centrifugal force of the element 17 is twice as large as the centrifugal force it had in the condition of Figure 5 (since in Figure 6 the element 17 has the radius of rotation $2a$ twice as large as its radius of rotation $a$ of Figure 5); likewise, in Figure 6, the opposing force of the spring is twice as large as the force it had in Figure 5 (since in Figure 6 the spring 18 is compressed a distance $2a$, twice the distance $a$ of Figure 5). Thus, it will be seen that when the disc 9 is rotating at its predetermined constant speed, the equality between the centrifugal force of the weight 17 and the opposing force of the spring 18 is not affected by the radial position of the element 17; and also air speeds above the predetermined minimum at which the disc attains its predetermined constant speed do not affect the rotational speed of the disc. At air speeds above the said predetermined minimum air speed (for example, 32 miles per hour), the pitch of the control vanes 15 and 16 is changed in accordance with the torque force required to maintain rotation of the disc 9 at the predetermined constant speed, for example, 32 R. P. S. It is only when rotation of the disc 9 varies from its predetermined constant rotational speed that the centrifugal force of the element 17 and the opposing force of the spring 18 become unbalanced.

Now assuming that the air speed to which the control device is subjected is above the predetermined minimum air speed (for example, assume that the air speed is 65 miles per hour and the disc 9 is rotating at constant speed), the pitch of the vanes 15 and 16 has been automatically adjusted in the manner previously described by the radial positioning of the element 17, to produce the torque force required to maintain the disc 9 rotating at its predetermined constant speed. The air speed is now decreased to 60 miles per hour. Under this condition the pitch of the vanes 15 and 16 is not too high to maintain the constant rotational speed of the disc at this decreased air speed. The rotation of the disc 9 tends to decrease to a rotational speed below the predetermined constant rotational speed. The force of the spring 18 now exceeds the centrifugal force of the element 17 causing the latter to move radially inwardly relative to the disc 9, thereby decreasing the pitch of the vanes 15 and 16, thereby increasing the angle of attack of the air stream acting upon the vanes and increasing the torque force causing rotation of the disc 9, and that results in increasing the rotation of the disc 9 toward constant speed.

As the rotation of the disc 9 increases to constant speed, the element 17 will move radially outwardly slightly, slightly increasing the vane pitch, decreasing the angle of attack of the air stream and decreasing the torque force to stop the increase of disc rotation when the constant rotational speed is again attained.

*General operation*

In the operation of an airplane, it is desirable to keep the pitch of the propeller blades at low pitch until the propeller attains a predetermined speed of rotation and until the airplane attains a predetermined minimum forward speed. The reason for this is that at low rotational speed of the propeller and at low forward speed of the airplane, high pitch of the propeller blades produces low efficiency of the propeller. In accordance with the invention, therefore, brake instrumentalities, previously described, are provided for positively interconnecting the control disc 9 for rotation with the propeller drive shaft 3 so that there will be no relative rotation between the control disc 9 and the propeller shaft 3 until these instrumentalities attain a predetermined rotational speed.

If it were not for the provision of the said brake instrumentalities, and the propeller shaft 3 were allowed to rotate relatively to the control disc 9 at the commencement of propeller rotation, the result would be that with the airplane standing still on the ground, and the throttle open, there would be little or no torque force tending to rotate the control disc 9 and the propeller shaft 3 would rotate relatively faster, which relative rotation would be effective to increase the pitch of the propeller blades to their maximum. The provision of the brake instrumentalities above mentioned prevents this situation from occurring and enables the propeller shaft 3 to attain a predetermined rotational speed before the control device becomes effective to increase the pitch of the propeller blades.

While it is desirable to keep the propeller blades at low pitch until the propeller shaft 3 attains a relatively high speed approaching the predetermined constant speed, it is not practicable to provide for the brake instrumentalities to be effective to maintain the propeller blades at low pitch for all rotational speeds of the propeller shaft up to the predetermined constant speed, because if the brake instrumentalities were only to become ineffective at or above the predetermined constant rotational speed, then the brake instrumentalities would become effective whenever the rotational speed of the propeller shaft drops below the predetermined constant speed even through at such time the pitch of the propeller blades happens to be at high or maximum pitch. This would prevent the control device from operating to decrease the pitch of the propeller blades when the rotational speed of the propeller shaft dropped below constant speed even though at such time the pitch provide that the brake instrumentalities become effective to couple the control disc 9 with the propeller shaft 3 at a rotational speed of the latter somewhat below predetermined constant rotational speed in order to provide a range of rotational speed below the predetermined constant rotational speed within which range the control device may operate to change the pitch of the propeller blades. It is for this reason that the brake instrumentalities are preferably designed so that the centrifugal brake members 38 and 38' will move outwardly so as to release the propeller shaft 3 from any interconnection with the control disc 9 whenever the propeller shaft 3 attains a rotational speed of approximately 90% of the predetermined constant rotational speed.

Now describing the general operation of the structure as when in actual use upon an airplane, we will assume that the control device B is designed to attain a rotational constant speed of 32 R. P. S. at an air speed of 32 miles per hour; that is when the airplane has a forward speed of 32 miles per hour. We will assume, also, that the airplane is standing still and the engine is at rest. The propeller blades 4 and 5 are at low pitch and the control disc 9 is disposed axially of the shaft 27 so that the rollers 41 and 41' are in engagement with the freely rotatable disc 43 on the hub 10 of the control device. As soon as the engine is started, the propeller shaft 3 will rotate counter-clockwise, looking toward the left of Figure 1, the propeller hub 1 will rotate counterclockwise, referring to Figure 3, and the shaft 27 will likewise rotate counterclockwise, referring to Figures 2 and 3. Since the disc 9 is at rest, the shaft 27 will be caused to rotate relative to the hub 10 on account of the threaded connection between the shaft 27 and hub 10, the control device B will be caused to move axially rightwardly relative to the shaft 27, referring to Figure 1, so that the rollers 41 and 41' will be engaged with the disc 42 in the condition shown in Figure 1, since the axial movement of the control device B relative to shaft 27 continues until the disc 9 abuts the washer 27b at the forward end of the shaft 27.

Now the control device B is locked to the propeller drive shaft 3 through the brake instrumentalities including rollers 41 and 41' engaging the periphery of the disc 42 so that the disc 9 rotates with the propeller shaft 3. This locked condition continues to exist until the propeller drive shaft 3 attains the rotational speed of 90% of the predetermined constant rotational speed, at which time centrifugal force of the weights 38 and 38' overbalances the opposing force of the springs 45 permitting the weights 38 and 38' to move radially outwardly, causing the rollers 41 and 41' to become disengaged from the disc 42, permitting the propeller drive shaft 3 and the propeller head A now to rotate independently of the control device B. If at this time the propeller drive shaft 3 and the propeller head A tend to rotate faster than the control disc 9, the result will be that the pitch of the propeller blades 4 and 5 will be increased, causing decrease in rotational speed of the propeller shaft 3 rotates faster than the control disc movement of the propeller blades through the air at the increased pitch. As long as the propeller shaft 3 rotates faster that the control disc 9 the pitch of the propeller blades 4 and 5 will continue to be increased to a higher pitch. This will cause slowing down of the rotational speed of the propeller shaft 3 until the rotational speed falls below 90% of the predetermined constant rotational speed at which time the brake elements 38 and 38' will move radially inwardly until the rollers 41 and 41' again engage the disc 42, whereupon the propeller shaft 3 will again be locked to the control disc 9 for rotation of the disc 9 with the propeller shaft 3.

As long as the airplane is standing still on the ground, there is little or no action of the air upon the control vanes 15 and 16 to tend to rotate the control device B so that whenever the propeller shaft 3 exceeds 90% of the constant rotational speed, the brake instrumentalities are freed from the disc 42, allowing the propeller shaft 3 to rotate independently of the control disc 9. As soon as this occurs, the rotational speed of the disc 9 will immediately decrease because there is no torque force tending to maintain its rotation. As the rotational speed of the disc 9 decreases relative to the rotational speed of the propeller shaft 3, the effect is to rotate the shaft 27 relatively to the propeller shaft 3. This in turn will cause rotation of the worm sleeve 30 frictionally connected to the shaft 27, and the worm sleeve 30, being in mesh with the gears 31 and 31', will set the gear trains 31, 33, 34, and 31', 33' and 34' in operation to rotate the propeller blades 4 and 5 about their axes to increase the pitch thereof.

Figure 10:
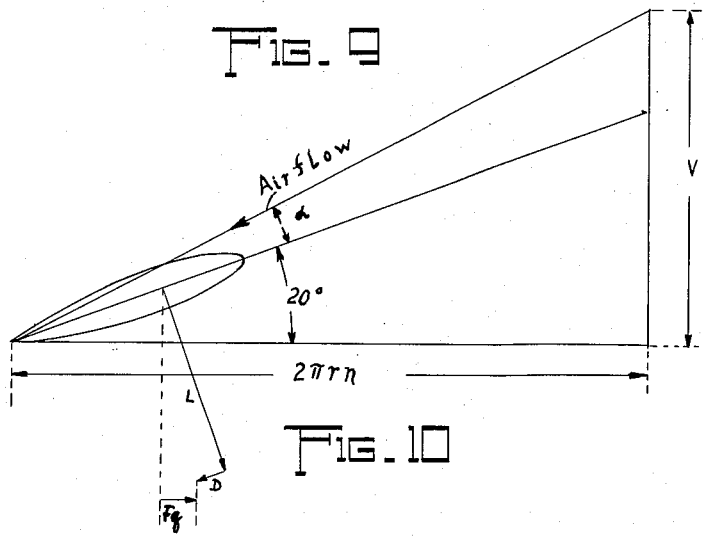

Thus, since the control disc 9 is locked to the propeller shaft 3 until the latter attains a rotational speed of approximately 90% of the predetermined constant rotational speed, the control device B is ineffective to increase the pitch of the propeller blades 4 and 5 from the slow pitch thereof existing at the time of starting the engine until the rotational speed of the propeller shaft 3 attains or exceeds 90% of the predetermined constant rotational speed. Also, whenever the propeller shaft 3 rotates faster than 90% of the predetermined constant rotational speed, and the brake instrumentalities are freed from the disc 42, there will be insufficient torque force acting upon the control vanes 15 and 16 to maintain the rotational speed of the disc 9 at or above 90% of the predetermined constant rotational speed until the airplane attains a certain forward speed. The explanation for this is seen by reference to Figures 9 and 10. With the control vanes 15 and 16 at minimum pitch of 20% at low air speeds such as illustrated in Figure 9, the angle of attack of the air with reference to the control vanes is such as to hit the vanes on their back sides, producing a positive pressure rearwardly of the vanes and a negative pressure forwardly thereof, resulting in a lift force L acting in the direction of the arrow in Figure 9 and producing a torque force tending to stop rotation of the disc 9. On the other hand, at the higher forward speed B of the airplane, as represented in Figure 10, the air stream acts to hit the control vane on the forward side, producing a lift L in the direction of the arrow in Figure 10 and a resultant torque force acting to produce rotation of the control disc 9.

Figure 11:
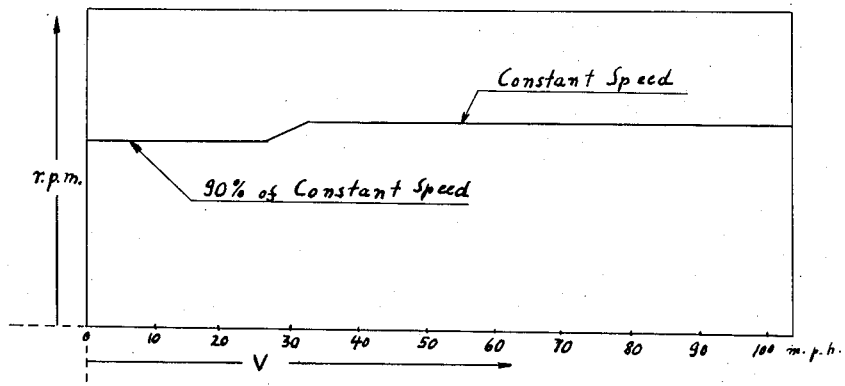
Figure 11 is a graphical illustration of the characteristic curve of the propeller during takeoff.

As represented graphicaly in Figure 11, the design of the control vanes 15 and 16 may be such that when the pitch thereof is 20°, the airplane would have to attain a forward speed of, for example, about 26 miles per hour before the air stream would have an angle of attack such as to hit the blades from the front to produce a torque force to cause rotation of the control disc 9. In accordance with this example, when the forward speed of the airplane exceeds the minimum speed required to produce independent rotation of the control disc 9 at about 26 miles per hour, the propeller shaft 3 will be allowed to increase its rotation gradually above 90% of constant speed until the control disc 9 attains its predetermined constant rotational speed of, for example, 32 R. P. S. at a forward speed of the airplane of about 32 miles per hour.

During the period that the airplane is increasing in speed from the minimum air speed which will produce independent rotation of the control disc until the control disc 9 attains its predetermined control speed, the control device B will act to vary the pitch of the propeller blades 4 and 5 as necessary to cause the propeller shaft 3 to rotate at the same speed of rotation as the disc 9.

Now as above mentioned, the control vanes 15 and 16 are designed so that the control disc 9 will attain its predetermined constant rotational speed at a predetermined minimum air speed while the control vanes 15 and 16 are at their minimum pitch of 20°. In other words, for reasons above mentioned, it requires a predetermined minimum speed of the air stream acting in front of the control vanes 15 and 16 in order to produce the torque force necessary to rotate the disc 9 at the predetermined constant rotational speed. This predetermined minimum air speed or minimum forward speed of the airplane at which a disc 9 will be caused to rotate at the predetermined constant rotational speed may, for example, be an air speed of 32 miles per hour as graphically illustrated in Figure 11. Once the airplane attains the predetermined minimum air speed of 32 miles per hour, the disc 9 will rotate at the predetermined constant rotational speed of 32 R. P. S. as long as the airplane has a forward speed of 32 miles per hour, or above. Since, under this condition, the brake instrumentalities are disengaged and the control disc 9 and propeller shaft 3 are permitted to rotate independently of one another, whenever the rotational speed of the propeller shaft 3 tends to vary from the predetermined constant rotational speed of 32 R. P. S., the control device B will be effective to change the pitch of the propeller blades 4 and 5 to bring the rotational speed of the propeller shaft 3 back to the predetermined constant rotational speed. If, for example, the rotational speed of the propeller shaft 3 tends to exceed the predetermined constant rotational speed of 32 R. P. S., the control disc 9 will impart a relative clockwise rotation to the shaft 27, referring to Figures 2 and 3, so that, in effect, the shaft 27 is caused to rotate clockwise relatively to the propeller shaft 3, assuming that the control disc 9 and propeller shaft 3 are both rotating counter-clockwise, referring to Figures 2 and 3. This relative clockwise movement of the shaft 27 with respect to the propeller shaft 3 will result in increasing the pitch of the propeller blades 4 and 5 so that they will absorb more energy under greater resistance or load, causing the speed of rotation of the propeller shaft 3 to decrease to the constant speed set by the control device B.

On the other hand, if the rotational speed of the propeller shaft 3 tends to decrease from the constant speed set by the control device B, the disc 9 will, under such conditions, effectively cause rotation of the shaft 27 in a counterclockwise direction relative to the rotation of the propeller shaft 3. Assuming that the parts were in the disposition of Figure 1, except that brakes 41—41' were free from disc 42, of course, the preliminary result of relative counterclockwise rotation of the disc 9 with respect to the propeller shaft 3 would be to cause axial movement of the disc 9 and its hub 10 leftwardly relative to the shaft 27, referring to Figure 1, due to the threaded connection between shaft 27 and hub 10, until the shoulder 10b of the hub 10 is caused to abut with the shoulder 27c of the shaft 27, whereupon the relative counterclockwise rotation of the disc 9 is then imparted to the shaft 27 and this acts through the worm sleeve 30 and gearing associaetd therewith to effect decrease of the pitch of the propeller blades 4 and 5 so that they absorb less energy under less resistance or load to thereby permit the propeller shaft 3 to increase its speed of rotation until it resumes the predetermined constant rotational speed set by the control device B.

It is desired to describe the operation when the airplane is brought in for a landing after a flight. When the plane is to be brought in for a landing, the pilot closes the throttle which slows down the engine with sudden decrease in rotational speed of the propeller shaft 3, while the control disc 9 continues to rotate at its constant rotational speed until the air speed decreases below the predetermined minimum air speed. When the throttle is closed for landing, it is desirable, of course, that the propeller blades 4 and 5 be concurrently adjusted to minimum pitch. The reason for this is that the landing may have to be broken off on account of some unforeseen dangerous condition when the plane is close to the ground and the propeller, therefore, should be adjusted so that, if necessary, the engine can attain high speed very rapidly when the landing has to be broken off and the throttle is opened when the plane is close to the ground. The engine can attain high speeds more rapidly, of course, if the pitch of the propeller blades is at minimum pitch.

Now is will be recalled that the brake instrumentalities above described go into operation when the propeller shaft 3 rotates at or below 90% of the predetermined constant rotational speed; that is to say, that the centrifugal brake elements 38 move radially inwardly until they are at their inward limit of radial movement when the propeller shaft 3 is rotating at or below 90% of its predetermined constant rotational speed. Now when the pilot closes the throttle for landing, if the brake instrumentalities were to become effective for locking the control disc 9 to the propeller shaft 3 when the latter slows down to 90% of its predetermined constant rotational speed, there would be not enough time for the control disc 9 to decrease the propeller pitch to minimum before the control disc 9 became locked to the propeller shaft 3. For this reason the freely rotatable disc 43 has been provided, and provision is made for axial shifting of the disc 9 and its hub 10 rearwardly under such condition, so that when the propeller shaft 3 has been operating at above 90% of its predetermined rotational speed, and is slowed down to 90% of its constant rotational speed, the radial inward movement of the centrifugal element 38 causes the rollers 41 and 41' to engage the disc 43 rather than the disc 42, and such engagement enables the control disc 9 to continue to rotate independently of the propeller shaft 3 so that the control disc 9 will be effective to decrease the pitch of the propeller blades 4 and 5 to their minimum as the propeller shaft 3 slows down.

For explanation, let us assume that a propeller shaft 3 and control disc 9 are rotating at predetermined constant rotational speed, with the airplane driving forwardly at cruising speed with the propeller blades 4 and 5 at relatively high pitch. Now under such conditions when the pilot closes the throttle for landing, the rotational speed of the propeller shaft 3 decreases rapidly, while, due to the forward speed of the airplane, the control disc 9 continues to rotate at higher rotational speed than the propeller shaft 3. On account of the threaded connection between the hub 10 and the shaft 27, this faster rotational speed of the control disc 9 will cause the same to move axially of the shaft 27 leftwardly, referring to Figure 1, until the shoulder 10b abuts the shoulder 27c on the shaft 27, at which time the freely rotatable disc 43 will be positioned for engagement with the rollers 41 and 41', when the rotational speed of the propeller shaft 3 drops down below 90% of its predetermined constant rotational speed. As before mentioned, when the control disc 9 rotates faster than the propeller shaft 3, after the axial movement of the hub 10 relative to shaft 27 causes abutment of shoulder 10b with shoulder 27c, the control disc 9 will be effective to rotate the shaft 27 to cause decrease of the pitch of the propeller blades 4 and 5. Under the conditions now being discussed, where the rotational speed of the propeller shaft 3 drops from a higher speed down to a rotational speed below 90% of its predetermined constant rotational speed, the faster rotation of the control disc 9 will be effective to cause decrease of the pitch of the propeller blades 4 and 5 to their minimum. On the other hand, whenever the rotational speed of the propeller shaft 3 increases from the lower speed up to or above 90% of its predetermined constant rotational speed, the disc 42 will be positioned for engagement with the rollers 41 and 41' so long as the rotational speed of the propeller shaft 3 is increasing or tends to rotate faster than the control disc 9.

It will be noted that gears 31 and 31' are provided with abutment members 55 which are arranged for abutting engagement with abutment members 56 secured to the housing 1 for limiting the pitch changing rotation of the blades 4 and 5 about their axes. Since a hard run into the limiting abutting engagement might damage the gearing, a cushioning slip connection between the worm sleeve 30 and the shaft 27 is provided. When the disc 9 rotating at high speed faster than the propeller shaft 3 is in action to relatively rotate the shaft 27 to decrease the pitch of the propeller blades 4 and 5, the worm sleeve 30 will produce a constant pressure against the spring 36. The spring pressure is normally greater than the opposing pressure of the worm sleeve. However, when the members 55 and 56 come into abutting relation, the rotation of the gears 31 and 31' is stopped suddenly, and the force is transmitted to the worm sleeve 30, this force, now being greater than the spring force, causes the spring 36 to yield, loosening the frictional engagement of the sleeve portion 29a with the cone 35, permitting the shaft 27 to rotate relatively to the worm sleeve 30 to the extent necessary to equalize the force acting on the worm sleeve with that of the spring 36. In other words, the worm sleeve 30 will only loosen so much that the slipping resistance of the cone 35 in the sleeve 30 gives enough torque force on the sleeve 30 so that the screwing force of the worm 30 is equal to the pressure of the spring 36. The slipping of the cone 35 in the sleeve 30 acts as a brake force on the cone 35 which will result in slowing down the rotation of the control disc 9 to the rotational speed of the shaft 3 under the conditions now being referred to.

Damping means

Figures 14 to 16 inclusive illustrate a modification of the form of the invention shown in Figures 1 to 3 inclusive, in reference to the provision of means for housing each of the centrifugal elements 17 of the control device B in a respective housing adapted to be filled with suitable substantially incompressible fluid, such as lubricating oil, serving to damp the radial movement of the elements 17 and to provide lubricacation therefor.

As shown in Figures 14, 15 and 16, each of the centrifugal elements 17 and its respective spring 18 is housed in a respective pair of cylinder halves 100 and 101 which are secured to the disc 9 by means of bolts 102, each cylinder half 100 and 101 having a flanged portion 103 abutting the disc 9 and provided with apertures receiving the bolts 102. The cylinder halves 100, 101 are machined to have a substantially oil-tight fit with the respective element 17. The cylinder halves 100, 101 also have an oil-tight fit with the disc 9 and for this purpose suitable gasket means may be interposed between the flanged portions 103 and the disc 9. Elements 17 are provided with slots 17a (Figure 1) receiving portions of the disc 9 for guiding the radial movement of elements 17, as above described.

Thus each pair of cylinder halves 100, 101 provides a cylindrical housing for the respective centrifugal element 17 and its respective spring 18, which housing is adapted to be filled with suitable hydraulic fluid, such as lubricating oil. Each element 17 has machined into its periphery a longitudinal groove 17d extending longitudinally of the element 17 in the direction of the axis of movement of the element 17 axially of its respective blade shaft 13. Groove 17d provides a passage through which the fluid in the cylindrical housing 100, 101 can pass from one side of the element 17 to the other side of the same whenever the element 17 moves radially of the disc 9 in the operation of the control device B. Each element 17 is also formed with a central sleeve portion 17e which closely surrounds the shaft part 13a with an oil-tight fit that prevents the oil from flowing through groove 19.

Preferably the construction of the invention as disclosed in Figures 1 through 3 will embody the modification of Figures 14 through 16, in order to eliminate any tendency of the elements 17 to over-correct the pitch of the vanes 15 and 16 which might otherwise exist but for the damping effect of the fluid in cylindrical housings 100, 101 upon the radial movement of the elements 17.

In the operation of the control means of Figures 1 through 3 embodying the modification of Figures 14 through 16, the hydraulic fluid in the cylinders 100, 101 will slow down the radial movement of the centrifugal elements 17 so that the pitch of the blades 15, 16 will be changed gradually to allow for lag in acceleration or deceleration of the control disc 9 following such radial movement of the centrifugal elements 17.

This damping effect upon the radial movement of the centrifugal elements 17 will thus eliminate any possible over-correction of the pitch of the blades 15, 16 and consequent "hunting" movement of the elements 17 which might otherwise result from too rapid radial movement of elements 17 without allowance for lag in acceleration or deceleration of control disc 9.

It will be apparent also that the use of lubricating oil as the hydraulic fluid in each cylinder 100, 101 serves to lubricate the mechanism housed therein in an oil bath.

The capacity of the groove 17d and the viscosity of the hydraulic fluid in the cylindrical housings 100, 101 will be calibrated so as to regulate the radial movement of the centrifugal elements 17 relative to the rotatable member 9 in such a manner as to coordinate the speed of radial movement of the centrifugal elements 17 with the rate of acceleration and deceleration of the rotatable member 9.

Modification construction

In Figures 12 and 13 there is shown a modification wherein the constant speed control instrumentalities are incorporated in the propeller itself, and this construction is designed for use on small airplanes where the necessary force for changing the pitch of the propeller blades is not too great.

In this construction the propeller drive shaft is indicated by the numeral 60 and it has suitably secured thereto the propeller hub 61 which is provided with radially and oppositely extending sleeve portions 62 and 63 which receive the inner ends of the propeller blades 64 and 65 mounted for rotation in said sleeve portions about the axes of said blades for varying the pitch thereof.

Within each of the hollow cylindrical inner end portions 64a and 65a of the propeller blades is mounted a respective centrifugal weight element 66 arranged for radial sliding movement in the respective hollow cylindrical portion of the blades. Each of the centrifugal elements 66 is provided with outwardly extending guide pins 67 extending through respective longitudinal slots 68 in the cylindrical portions of the propeller blades 64 and 65, and these guide pins 67 are provided at their outer ends with guide rollers 69 arranged for cooperation with helical grooves 70 provided in the respective sleeve portions 62 or 63. The inward radial movement of the centrifugal elements 66 with respect to the blades 64 and 65 is limited by abutment of the elements 66 with their respective plugs provided at the inner end of the cylindrical portion of each blade 64 and 65, the said plugs being designated by the numeral 71. Each of the elements 66 is provided with a central recess 72 for receiving the spring 73. The recess 72 provides a seat 72a the center of gravity for engaging one end of the spring 73. The opposite end of the spring 73 engages a baffle 74 provides in each of the propeller blades 64 and 65, the baffle or rib 74 being provided with a seat 74a for receiving that end of the spring which is compressed between the baffle 74 and the centrifugal element 66 opposing radial outward movement of the element 66 in the normal condition of the parts as illustrated in Figure 12 when the propeller is at rest.

While the spring 73 and centrifugal element 66 are only seen in respect to one propeller blade, namely blade 64, in Figure 12, it will be understood that these elements are duplicated in the other propeller blade 65.

The elements 71 provide on each of the blades 64 and 65 are formed as bevel gears having bevel gear teeth 75 meshing with a pinion 76 freely rotatable on a stub shaft 77 carried by the propeller shaft 60. This gearing between the blades 64 and 65 enables the same to be rotated about their axes simultaneously for changing the pitch thereof in the same phase relation.

The calibration of the spring 73 and centrifugal element 66 for each propeller blade, and the arrangement of these elements with respect to the center or axis of rotation of the propeller is the same as that described in reference to the calibration and arrangement of the corresponding elements in reference to the center or axis of rotation of the control disc 9. In other words, the axis of the spring 73 is disposed radially of the center of rotation of the propeller, which is the axis of the propeller shaft 60, and the centrifugal element 66 is disposed for radial movement along the same radial line. The arrangement of the spring 73 is such that its radially inner end engaged with the seat 72a would lie at the center or axis of rotation of the propeller with the spring 73 in unstressed condition. Thus, the spring, in the condition of Figure 12, is arranged so that it is stressed by a force initially applied thereto at the center or axis of rotation, which force acts upon the spring 73 from the center or axis of rotation in a direction radially outwardly from the center or axis of rotation.

The centrifugal element 66 is arranged for movement radially of the shaft 60 along the axis of the spring 73 and the element 66 is disposed so that it engages the radially inner end of spring 73 at the center of gravity of the element 66.

Thus the relation of the parts 66 and 73 is such that the radius of rotation of the centrifugal element 66 is the distance by which the spring 73 is compressed along its axis or length. This relationship always exists irrespective of the radial position of the element 66.

The centrifugal element 66 and its associated spring 73 are calibrated so that the produced force of the spring 73 (due to compression thereof) opposing radial movement of the centrifugal element 66 outwardly of the propeller blade equals the centrifugal force of the element 66 at a predetermined speed of rotation of the propeller and shaft 60, which predetermined speed of rotation is the constant speed at which it is desired to cause the propeller 60 to rotate for uniform operation.

Now describing the operation of the construction of Figures 12 and 13, it may be noted that the centrifugal element 66 is normally disposed as shown in Figure 12 at its limit of inward radial movement, and under this condition the blades 64 and 65 will be at minimum pitch. The elements will remain in this condition until the propeller and shaft 60 attain their predetermined constant speed of rotation, the spring force of the spring 73 exceeding the centrifugal force of the element 66 until the predetermined constant rotational speed is attained, at which time the forces become equal. If the propeller and shaft 60 rotate faster than the predetermined constant rotational speed, the centrifugal element 66 will tend to move radially outwardly. Hence under such conditions the centrifugal force of the element 66 exceeds the opposing force of the spring 73 and radial outward movement of the element 66 will cause the blades 64 and 65 to be rotated about their axes to increase the pitch of the blades, due to the cooperation of the guide rollers 69 with the helical slots 70. In other words, the radial movement of the centrifugal element 66 acts with a screwing action to rotate the same about its radial axis and the guide pins 67 working in the longitudinal slot 68 will cause a corresponding rotation of the propeller blades 64 and 65.

The increase in the pitch of the propeller blades 64 and 65 occurring when the rotational speed of the propeller exceeds the predetermined constant speed, serves to slow down the rotation of the propeller to constant speed. As the propeller rotates to slow down to constant speed, the centrifugal element 66 will move radially inwardly slightly, decreasing the pitch of the propeller blades 64 and 65 to the point necessary to maintain constant speed at the particular air speed of the airplane. Thus the centrifugal force of the element 66 and the force of the spring 73 will be again equalized when the propeller rotation drops back to constant speed.

It will be noted that the centrifugal element 66 will have a radial position for each particular air speed as long as the propeller and shaft 60 are rotating at constant speed, which radial position will be dependent upon the pitch of the propeller blades 64 and 65 necessary to maintain the rotation of the propeller and shaft 60 at predetermined constant rotational speed. As long as the propeller and shaft 60 are rotating at predetermined constant rotational speed, the centrifugal force of the element 66 and the force of the spring 73 opposing radial outward movement thereof will be equal.

I am aware that there are prior propeller control constructions in which a centrifugal weight is arranged for radial outward movement by centrifugal force opposed by a spring and such radial movement of the centrifugal weight is used to vary the pitch of the propeller blades. However, the special relationship between the spring and the centrifugal element as herein disclosed is believed to be novel.

It will be apparent that the modification of Figures 12 and 13 may readily avail of damping means, similar to that of Figures 14 through 16 applicable to the construction of Figures 1 through 3, whereby to coordinate the speed of radial movement of the centrifugal elements 66 with rate of acceleration and deceleration of the propeller 61—65 so as to allow for lag in such acceleration or deceleration and eliminate any "hunting" movement of the centrifugal elements 66.

For this purpose it is only necessary to fill the hollow portions 64a, 65a, of the propeller blades 64, 65 with suitable hydraulic fluid such as lubricating oil and to provide passages for the fluid from one side to the other of the centrifugal elements 66, such as the passages provided by the grooves 17d in reference to the elements 17 of the construction of Figures 1 through 3.

Having thus described my invention, what I claim as new and desire to secure by Letters Patent of the United States, is:

1. Mechanism of the class described, comprising, in combination, a rotatable member, a centrifugally responsive element carried thereby for movement radially thereof, spring means yieldably opposing radial outward movement of said element and disposed with its axis extending radially of the axis of rotation of said rotatable member, and means responsive to radial movement of said element for varying the torque force applied to said rotatable member when its rotational speed varies from a predetermined rotational speed, said element cooperating with said spring at the center of gravity of said element with a force acting on said spring from said axis of rotation radially outwardly therefrom, said element and said spring being arranged so that the radius of rotation of said element is the distance by which the spring is stressed along its axial length and means cooperative with said centrifugally responsive element for coordinating the speed of radial movement thereof with the rate of acceleration and deceleration of the rotatable member.

2. Mechanism of the class described, comprising, in combination, a rotatable member, a centrifugally responsive element carried thereby for movement radially thereof, spring means yieldably opposing radial outward movement of said element and disposed with its axis extending radially of the axis of rotation of said rotatable member, and means responsive to radial movement of said element for varying the torque force applied to said rotatable member when its rotational speed varies from a predetermined rotational speed, said element cooperating with said spring at the center of gravity of said element with a force acting on said spring from said axis of rotation radially outwardly therefrom, said element and said spring being arranged so that the radius of rotation of said element is the distance by which the spring is stressed along its axial length, a housing for said centrifugally responsive element, said housing constructed to permit said radial movement of the centrifugally responsive element therewithin, a body of substantially incompressible fluid filling said housing, means providing a passage through which said fluid may pass from one side of the centrifugally responsive element to the other side thereof upon radial movement of said centrifugally responsive element relative to said rotatable member.

3. Mechanism of the class described, comprising, in combination, a rotatable member, a centrifugally responsive element carried thereby for movement radially thereof, spring means yieldably opposing radial outward movement of said element and disposed with its axis extending radially of the axis of rotation of said rotatable member, and means responsive to radial movement of said element for varying the torque force applied to said rotatable member when its rotational speed varies from a predetermined rotational speed, said element cooperating with said spring at the center of gravity of said element with a force acting on said spring from said axis of rotation radially outwardly therefrom, said element and said spring being arranged so that the radius of rotation of said element is the distance by which the spring is stressed along its axial length, a respective housing for said centrifugally responsive element, said housing constructed to permit said radial movement of the centrifugally responsive element therewithin, a body of lubricating oil filling said housing, said centrifugally responsive element having substantially oiltight sliding fit with said housing, and said centrifugally responsive element having means providing a passage through which said fluid may pass from one side of the centrifugally responsive element to the other side thereof upon radial movement of said centrifugally responsive element relative to said rotatable member, the capacity of said passage and the viscosity of said oil being calibrated to coordinate the speed of said radial movement of the centrifugally responsive element with the rate of acceleration and deceleration of the rotatable member.

4. Mechanism of the class described, comprising, in combination, a rotatable member, blade elements mounted thereon with their axes disposed radially thereof, centrifugally responsive elements carried by the rotatable member for movement relative thereto radially thereof, said centrifugally responsive elements cooperating with the blade elements to rotate same about their axes to vary the pitch thereof upon radial movement of the centrifugally responsive elements, and resilient means associated with the centrifugally responsive elements for opposing outward movement of the latter radially of said member, said resilient means being stressed by cooperation with said centrifugally responsive elements at the center of gravity thereof with a force acting upon the resilient means from the axis of rotation of the rotatable member radially outwardly from said latter axis, said resilient means and said centrifugally responsive elements being arranged so that the radius of rotation of the latter is the distance by which the resilient means is stressed to produce the force opposing radial outward movement of said centrifugally responsive elements.

5. Mechanism of the class described, comprising, in combination, supporting means, a propeller therefor mounted for rotation thereon, a control device comprising a rotatable member mounted on said supporting means for rotation independently of said propeller, about an axis alined with the rotational axis of said propeller, vane elements mounted on said rotatable member with their axes disposed radially thereof, centrifugally responsive elements carried by the rotatable member for movement relative thereto radially thereof, said centrifugally responsive elements cooperating with the vane elements to rotate same about their axes to vary the pitch thereof upon radial movement of the centrifugally responsive elements, and resilient means associated with the centrifugally responsive elements for opposing outward movement of the latter radially of said member, said resilient means being stressed by cooperation with said centrifugally responsive elements at the center of gravity thereof with a force acting upon the resilient means from the axis of rotation of the rotatable member radially outwardly therefrom, said propeller having propeller blades mounted thereon for rotation about their axes to vary the pitch thereof, and means interconnecting said rotatable member and said propeller blades for rotating the same about their axes responsive to a variation between the rotational speed of the propeller and the rotational speed of said rotatable member.

6. Mechanism of the class described, comprising, in combination, a rotatable member, a centrifugally responsive element carried thereby for movement radially thereof, spring means yieldably opposing radial outward movement of said element, and disposed with its axis extending radially of the axis of rotation of said rotatable member, said centrifugal responsive element being associated with the rotatable member for movement radially thereof along the radial axis of the spring, and means responsive to radial movement of said element for varying the torque force applied to said rotatable member when its rotational speed varies from a predetermined rotational speed, said element cooperating with said spring at the center of gravity of said element with a force acting on said spring from said axis of rotation of the rotatable member radially outwardly from said latter axis, said element and said spring being arranged so that the radius of rotation of said element is the distance by which the spring is stressed along its axial length.

7. Mechanism of the class described, comprising, in combination, a rotatable member, a centrifugally responsive element carried thereby for movement radially thereof, spring means yieldably opposing radial outward movement of said element and disposed with its axis extending radially of the axis of rotation of said rotatable member, and means for rotating said member at a rotational speed which is a function of its speed of linear travel, including means responsive to radial movement of said element for varying the torque force applied to said rotatable member when its rotational speed varies from a predetermined rotational speed, said element cooperating with said spring at the center of gravity of said element with a force acting on said spring from said axis of rotation of the rotatable member, radially outwardly from said latter axis, said element and said spring being arranged so that the radius of rotation of said element is the distance by which the spring is stressed along its axial length.

8. Mechanism of the class described, comprising, in combination, a rotatable member, a centrifugally responsive element carried thereby for movement radially thereof, resilient means yieldably opposing radial outward movement of said element, and means responsive to radial movement of said element for varying the torque force applied to said rotatable member when its rotational speed varies from a predetermined rotational speed, said resilient means being stressed by cooperation with said element at the center of gravity thereof with a force acting upon the resilient means from the axis of rotation of the rotatable member radially outwardly from said latter axis, said resilient means and said element being arranged so that the radius of rotation of the latter is the distance by which the resilient means is stressed to produce the force opposing radial outward movement of said element.

9. Mechanism of the class described, comprising, in combination, propeller supporting means, a propeller therefor mounted for rotation thereon, a rotatable member mounted on said supporting means for rotation independently of said propeller, a centrifugally responsive element carried by said rotatable member for movement radially thereof, resilient means yieldably opposing radial outward movement of said element, means to rotate said rotatable member at a rotational speed which is a function of the speed of bodily travel of said supporting means, said centrifugally responsive element cooperating with said rotation means to vary the torque force applied thereby to rotate the rotatable member upon radial movement of said centrifugal element, said resilient means being stressed by cooperation with said element at the center of gravity thereof with a force acting upon the resilient means from the axis of rotation of the rotatable member radially outwardly therefrom, and means responsive to a variation between the rotational speeds of the propeller and rotatable member for varying the rotational speed of the propeller to bring the rotational speed of the propeller back toward the rotational speed of the rotatable member.

10. Mechanism of the class described, comprising, in combination, propeller supporting means, a propeller therefor mounted for rotation thereon and having variable pitch propeller blades, a rotatable member mounted on said supporting means for rotation independently of said propeller, a centrifugally responsive element carried by said rotatable member for movement radially thereof, resilient means yieldably opposing radial outward movement of said element, variable pitch blade elements carried by said rotatable member for rotating the same under the influence of the pressure of atmospheric air acting thereon incident to bodily movement of the supporting means, means responsive to radial movement of said centrifugally responsive element for varying the pitch of said blade elements, said resilient means being stressed by cooperation with said centrifugally responsive element at the center of gravity thereof with a force acting upon the resilient means from the axis of rotation of the rotatable member radially outwardly from said latter axis, and means responsive to a variation between the rotational speeds of the propeller and rotatable members for varying the pitch of the propeller blades to bring the rotational speed of the propeller back toward the rotational speed of the rotatable member.

11. Mechanism of the class described, comprising, in combination, propeller supporting means, a propeller therefor mounted for rotation thereon, a rotatable member mounted on said supporting means for rotation independently of said propeller, a centrifugally responsive element carried by said rotatable member for movement radially thereof, resilient means yieldably opposing radial outward movement of said element, means to rotate said rotatable member at a rotational speed which is a function of the speed of bodily travel of said supporting means, said centrifugally responsive element cooperating with said rotation means to vary the torque force applied thereby to rotate the rotatable member upon radial movement of said centrifugal element, said resilient means being stressed by cooperation with said centrifugal element at the center of gravity thereof with a force acting upon the resilient means from the axis of rotation of the rotatable member radially outwardly therefrom, and means responsive to a variation between the rotational speeds of the propeller and rotatable member for varying the rotational speed of the propeller to bring the rotational speed of the propeller back toward the rotational speed of the rotatable member, combined with a centrifugal brake element carried by said propeller for radial movement relative thereto and cooperating with the rotatable member to lock the same to the propeller for rotation therewith, resilient means yieldably opposing radial outward movement of said brake element, said brake element and said resilient means being calibrated to permit radial outward movement of the brake element for releasing the locked relation at a predetermined rotational speed of the propeller.

12. Mechanism of the class described, comprising, in combination, propeller supporting means, a propeller therefor mounted for rotation thereon, a rotatable member mounted on said supporting means for rotation independently of said propeller, a centrifugally responsive element carried by said rotatable member for movement radially thereof, resilient means yieldably opposing radial outward movement of said element, means to rotate said rotatable member at a rotational speed which is a function of the speed of bodily travel of said supporting means, said centrifugally responsive element cooperating with said rotation means to vary the torque force applied thereby to rotate the rotatable member upon radial movement of said centrifugal element, said resilient means being stressed by cooperation with said centrifugal element at the center of gravity thereof with a force acting upon the resilient means from the axis of rotation of the rotatable member radially outwardly therefrom, and means responsive to a variation between the rotational speeds of the propeller and rotatable member for varying the rotational speed of the propeller to bring the rotational speed of the propeller back toward the rotational speed of the rotatable member, wherein the last means includes a shaft carried by the propeller for rotation therewith and also independently thereof, said shaft being connected with said rotatable member for rotation thereby relatively to the propeller upon a variation between the rotational speeds of the propeller and said rotatable member, a driving member yieldably connected with said shaft for rotation therewith up to a predetermined loading and for rotation relative to said shaft when the resistance to rotation thereof exceeds said loading, and means interconnecting said driving member with said propeller blades for varying the pitch thereof upon rotation of said driving member.

13. Mechanism of the class described, comprising, in combination, propeller supporting means, a propeller therefor mounted for rotation thereon, a rotatable member mounted on said supporting means for rotation independently of said propeller, a centrifugally responsive element carried by said rotatable member for movement radially thereof, resilient means yieldably opposing radial outward movement of said element, means to rotate said rotatable member at a rotational speed which is a function of the speed of bodily travel of said supporting means, said centrifugally responsive element cooperating with said rotation means to vary the torque force applied thereby to rotate the rotatable member upon radial movement of said centrifugal element, said resilient means being stressed by cooperation with said centrifugal element at the center of gravity thereof with a force acting upon the resilient means from the axis of rotation of the rotatable member radially outwardly therefrom, and means responsive to a variation between the rotational speeds of the propeller and rotatable member for varying the rotational speed of the propeller to bring the rotational speed of the propeller back toward the rotational speed of the rotatable member, wherein the last means includes a shaft carried by the propeller for rotation therewith and also independently thereof, said rotatable member being rotatably mounted on said shaft for limited axial shifting movement relative thereto upon rotation of said rotatable member relative to said shaft and for rotation of said shaft with said rotatable member at the limits of axial shifting movement, a centrifugal brake element carried by said propeller for radial movement relative thereto and engageable with the rotatable member to lock the same to the propeller when the rotatable member is at one limit of axial shifting movement, and a rotatable element carried by said rotatable member for rotation relative thereto and engageable with the centrifugal brake element when the rotatable member is at its other limit of axial shifting movement.

14. Mechanism of the class described, comprising, in combination, a propeller having variable pitch propeller blades, a centrifugally responsive weight element for each blade and arranged for movement radially of the propeller axis and cooperable with its blade to vary the pitch thereof upon radial movement of said element, and resilient means yieldably opposing radial movement of said elements, said resilient means being stressed by cooperation with said elements at the center of gravity of the latter with a force acting upon resilient means from the axis of rotation of the propeller radially outwardly from said latter axis, said resilient means and said elements being arranged so that the radius of rotation of the latter is the distance which the resilient means is stressed to produce the force opposing radial outward movement of said element.

15. Mechanism of the class described, comprising, in combination, propeller supporting means, a propeller therefor mounted for rotation thereon, a rotatable member mounted on said supporting means for rotation independently of said propeller, a centrifugally responsive element carried by said rotatable member for movement radially thereof, resilient means yieldably opposing radial outward movement of said element, means to rotate said rotatable member at a rotational speed which is a function of the speed of bodily travel of said supporting means, said centrifugally responsive element cooperating with said rotation means to vary the torque force applied thereby to rotate the rotatable member upon radial movement of said centrifugal element, said resilient means being stressed by cooperation with said centrifugal element at the center of gravity thereof with a force acting upon the resilient means from the axis of rotation of the rotatable member radially outwardly therefrom, and means responsive to a variation between the rotational speeds of the propeller and rotatable member for varying the rotational speed of the propeller to bring the rotational speed of the propeller back toward the rotational speed of the rotatable member, wherein the last means includes a shaft carried by the propeller for rotation therewith and also independently thereof, said rotatable member being rotatably mounted on said shaft for limited axial shifting movement relative thereto upon rotation of said rotatable member relative to said shaft and for rotation of said shaft with said rotatable member at the limits of axial shifting movement, a centrifugal brake element carried by said propeller for radial movement relative thereto and engageable with the rotatable member to lock the same to the propeller when the rotatable member is at one limit of axial shifting movement, and a rotatable element carried by said rotatable member for rotation relative thereto and engageable with the centrifugal brake element when the rotatable member is at its other limit of axial shifting movement, a driving member yieldably connected with said shaft for rotation therewith up to a predetermined loading and for rotation relative to said shaft when the resistance to rotation thereof exceeds said loading, and means interconnecting said driving member with said propeller blades for varying the pitch thereof upon rotation of said driving member.

16. Mechanism of the class described, comprising, in combination, propeller supporting means, a propeller therefor mounted for rotation thereon, a rotatable member mounted on said supporting means for rotation independently of said propeller, a centrifugally responsive element carried by said rotatable member for movement radially thereof, resilient means yieldably opposing radial outward movement of said element, means to rotate said rotatable member at a rotational speed which is a function of the speed of bodily travel of said supporting means, said centrifugally responsive element cooperating with said rotation means to vary the torque force applied thereby to rotate the rotatable member upon radial movement of said centrifugal element, said resilient means being stressed by cooperation with said centrifugal element at the center of gravity thereof with a force acting upon the resilient means from the axis of rotation of the rotatable member radially outwardly therefrom, and means responsive to a variation between the rotational speeds of the propeller and rotatable member for varying the rotational speed of the propeller to bring the rotational speed of the propeller back toward the rotational speed of the rotatable member, combined with means for interconnecting the propeller and the rotatable member for rotation together, and means for releasing the propeller and rotatable member from such interconnected relation at a predetermined rotational speed of the propeller.

17. Mechanism of the class described, comprising, in combination, propeller supporting means, a propeller therefor mounted for rotation thereon, a rotatable member mounted on said supporting means for rotation independently of said propeller, a centrifugally responsive element carried by said rotatable member for movement radially thereof, resilient means yieldably opposing radial outward movement of said element, means to rotate said rotatable member at a rotational speed which is a function of the speed of bodily travel of said supporting means, said centrifugally responsive element cooperating with said rotation means to vary the torque force applied thereby to rotate the rotatable member upon radial movement of said centrifugal element, said resilient means being stressed by cooperation with said centrifugal element at the center of gravity thereof with a force acting upon the resilient means from the axis of rotation of the rotatable member radially outwardly therefrom, and means responsive to a variation between the rotational speeds of the propeller and rotatable member for varying the rotational speed of the propeller to bring the rotational speed of the propeller back toward the rotational speed of the rotatable member, wherein the last means includes motion transmitting parts having yieldable connection therebetween.

18. Mechanism of the class described, comprising, in combination, propeller supporting means, a propeller therefor mounted for rotation thereon, a rotatable member mounted on said supporting means for rotation independently of said propeller, a centrifugally responsive element carried by said rotatable member for movement radially thereof, resilient means yieldably opposing radial outward movement of said element, means to rotate said rotatable member at a rotational speed which is a function of the speed of bodily travel of said supporting means, said centrifugally responsive element cooperating with said rotation means to vary the torque force applied thereby to rotate the rotatable member upon radial movement of said centrifugal element, said resilient means being stressed by cooperation with said centrifugal element at the center of gravity thereof with a force acting upon the resilient means from the axis of rotation of the rotatable member radially outwardly therefrom, and means responsive to a variation between the rotational speeds of the propeller and rotatable member for varying the rotational speed of the propeller to bring the rotational speed of the propeller back toward the rotational speed of the rotatable member, combined with means for effecting axial movement of the rotatable member relatively to the propeller responsive to a variation between the rotational speed of the propeller and the rotational speed of the rotatable member of an opposite nature from the immediately preceding variation in rotational speed.

19. Mechanism of the class described, comprising, in combination, a rotatable member, blade elements mounted thereon with their axes disposed radially of said member, a respective centrifugally responsive element for each blade element carried by the rotatable member for movement radially thereof, said centrifugally responsive elements cooperating with the blade elements to rotate the same about their axes to vary the pitch thereof upon radial movement of the centrifugally responsive elements, and a respective spring element for each blade element, each spring element having its axis disposed radially of said centrifugal member and yieldably opposing radial outward movement of a respective centrifugally responsive element, each spring element being stressed by cooperation with its centrifugally responsive element at the center of gravity of the latter, with a force acting upon said spring element from the axis of rotation of said rotatable member radially outwardly from said axis of rotation whereby the spring elements and centrifugally responsive elements are arranged so that the radius of rotation of the latter is the distance by which the spring elements are stressed along their axes.

20. Mechanism of the class described comprising, in combination, propeller supporting means, a propeller therefor mounted for rotation thereon, a rotatable member mounted on said supporting means for rotation independently of said propeller means to rotate said rotatable member at a constant speed, and means responsive to a variation between the rotational speeds of the propeller and rotatable member for varying the rotational speed of the propeller to bring the rotational speed of the propeller back toward the rotational speed of the rotatable member, said last means including a shaft carried by the propeller for rotation independently thereof, said shaft being connected with said rotatable member for rotation thereby relatively to the propeller upon a variation between the rotational speeds of the propeller and said rotatable member, a sleeve mounted on said shaft for rotation relative thereto, said sleeve and said shaft having cooperating conical portions, resilient means yieldably urging the conical portions of the shaft and sleeve into frictional engagement for rotation of the sleeve with the shaft up to a predetermined loading and permitting rotation of the sleeve relative to said shaft when resistance to rotation thereof exceeds said loading, and means interconnecting said sleeve with said propeller blades for varying the pitch thereof upon rotation of said sleeve.

21. Mechanism of the class described comprising, in combination, propeller supporting means, a propeller therefor mounted for rotation thereon, a rotatable member mounted on said supporting means for rotation independently of said propeller, means to rotate said rotatable member at a constant speed, and means responsive to a variation between the rotational speeds of the propeller and rotatable member for varying the rotational speed of the propeller to bring the rotational speed of the propeller back toward the rotational speed of the rotatable member, said last means including a shaft carried by the propeller for rotation independently thereof, said shaft being connected with said rotatable member for rotation thereby relatively to the propeller upon a variation between the rotational speeds of the propeller and said rotatable member, a sleeve having a worm thread and mounted on said shaft for rotation relative thereto, said sleeve and said shaft having cooperating conical portions, a thrust bearing comprising a bearing race fixed to said shaft and a cooperating bearing race freely rotatable on said shaft, spring means interposed between said latter race and said sleeve and yieldably urging the sleeve axially of the shaft for frictional engagement of said conical portions for rotation of the sleeve with the shaft up to a predetermined loading and permitting rotation of the sleeve relative to said shaft when resistance to rotation thereof exceeds said loading, and means including a gear meshing with the worm thread of said sleeve for interconnecting said sleeve with the propeller blades to vary the pitch thereof upon rotation of said sleeve.

22. Mechanism of the class described comprising, in combination, propeller supporting means, a propeller therefor mounted for rotation thereon, a rotatable member mounted on said supporting means for rotation independently of said propeller, means to rotate said rotatable member at a constant speed, and means responsive to a variation between the rotational speeds of the propeller and rotatable member for varying the rotational speed of the propeller to bring the rotational speed of the propeller back toward the rotational speed of the rotatable member, said last means including a shaft carried by the propeller for rotation therewith and also independently thereof, said shaft being connected with said rotatable member for rotation thereby relatively to the propeller upon a variation between the rotational speeds of the propeller and said rotatable member, a driving member yieldably connected with said shaft for rotation therewith up to a predetermined loading and for rotation relative to said shaft when the resistance to rotation thereof exceeds said loading, and means interconnecting said driving member with said propeller blades for varying the pitch thereof upon rotation of said driving member.

23. Mechanism of the class described comprising, in combination, propeller supporting means, a propeller therefor mounted for rotation thereon, a rotatable member mounted on said supporting means for rotation independently of said propeller, means to rotate said rotatable member, and means responsive to a variation between the rotational speeds of the propeller and rotatable member for varying the rotational speed of the propeller to bring the rotational speed of the propeller back toward the rotational speed of the rotatable member, said last means including a shaft carried by the propeller for rotation therewith and also independently thereof, said rotatable member being rotatably mounted on said shaft for limited axial shifting movement relative thereto upon rotation of said rotatable member relative to said shaft and for rotation of said shaft with said rotatable member at the limits of axial shifting movement, a centrifugal brake element carried by said propeller for radial movement relative thereto and engageable with the rotatable member to lock the same to the propeller when the rotatable member is at one limit of axial shifting movement, and a rotatable element carried by said rotatable member for rotation relative thereto and engageable with the centrifugal brake element when the rotatable member is at its other limit of axial shifting movement.

24. Mechanism of the class described comprising, in combination, propeller supporting means, a propeller therefor mounted for rotation thereon, a rotatable member mounted on said supporting means for rotation independently of said propeller, means to rotate said rotatable member, and means responsive to a variation between the rotational speeds of the propeller and rotatable member for varying the rotational speed of the propeller to bring the rotational speed of the propeller back toward the rotational speed of the rotatable member, said last means including a shaft carried by the propeller for rotation therewith and also independently thereof, said shaft having a screw portion and said rotatable member having a hub provided with a screw portion cooperable with the screw portion of said shaft for rotatably mounting the rotatable member on said shaft for limited axial shifting movement relative thereto upon rotation of said rotatable member relative to said shaft and for rotation of said shaft with said rotatable member at the limits of axial shifting movement, a disc fixed to said hub, a centrifugal brake element carried by said propeller for radial movement relative thereto and engageable with said disc to lock the rotatable member to the propeller when the rotatable member is at one limit of the shaft screw portion, and a rotatable disc carried by said rotatable member for rotation relative thereto and engageable with the centrifugal brake element when the rotatable member is at the other limit of the shaft screw portion.

25. Mechanism of the class described comprising, in combination, propeller supporting means, a propeller therefor mounted for rotation thereon, a rotatable member mounted on said supporting means for rotation independently of said propeller, means to rotate said rotatable member, and means responsive to a variation between the rotational speeds of the propeller and rotatable member for varying the rotational speed of the propeller to bring the rotational speed of the propeller back toward the rotational speed of the rotatable member, said last means including a shaft carried by the propeller for rotation therewith and also independently thereof, said rotatable member being rotatably mounted on said shaft for limited axial shifting movement relative thereto upon rotation of said rotatable member relative to said shaft and for rotation of said shaft with said rotatable member at the limits of axial shifting movement, a centrifugal brake element carried by said propeller for radial movement relative thereto and engageable with the rotatable member to lock the same to the propeller when the rotatable member is at one limit of axial shifting movement, and a rotatable element carried by said rotatable member for rotation relative thereto and engageable with the centrifugal brake element when the rotatable member is at its other limit of axial shifting movement, a driving member yieldably connected with said shaft for rotation therewith up to a predetermined loading and for rotation relative to said shaft when the resistance to rotation thereof exceeds said loading, and means interconnecting said driving member with said propeller blades for varying the pitch thereof upon rotation of said driving member.

26. Mechanism of the class described comprising, in combination, propeller supporting means, a propeller therefor mounted for rotation thereon, a rotatable member mounted on said supporting means for rotation independently of said propeller, means to rotate said rotatable member, and means responsive to a variation between the rotational speeds of the propeller and rotatable member for varying the rotational speed of the propeller to bring the rotational speed of the propeller back toward the rotational speed of the rotatable member, said last means including a shaft carried by the propeller for rotation therewith and also independently thereof, said shaft having a screw portion and said rotatable member having a hub provided with a screw portion cooperable with the screw portion of said shaft for rotatably mounting the rotatable member on said shaft for limited axial shifting movement relative thereto upon rotation of said rotatable member relative to said shaft and for rotation of said shaft with said rotatable member at the limits of axial shifting movement, a disc fixed to said hub, a centrifugal brake element carried by said propeller for radial movement relative thereto and engageable with said disc to lock the rotatable member to the propeller when the rotatable member is at one limit of the shaft screw portion, and a rotatable disc carried by said rotatable member for rotation relative thereto and engageable with the centrifugal brake element when the rotatable member is at the other limit of the shaft screw portion, a sleeve mounted on said shaft for rotation relative thereto, said sleeve and said shaft having cooperating conical portions, resilient means yieldably urging the conical portions of the shaft and sleeve into frictional engagement for rotation of the sleeve with the shaft up to a predetermined loading and permitting rotation of the sleeve relative to said shaft when resistance to rotation thereof exceeds said loading, and means interconnecting said sleeve with said propeller blades for varying the pitch thereof upon rotation of said sleeve.

27. Mechanism of the class described, comprising, in combination, propeller supporting means, a propeller therefor mounted for rotation thereon, and having variable pitch propeller blades, a control device comprising a rotatable disc mounted on said supporting means for rotation independently of said propeller, variable pitch vane elements mounted on said disc for rotating the same under the influence of atmospheric air pressure incident to bodily movement of the supporting means, a centrifugal responsive element for each vane element, said centrifugally responsive elements mounted on said disc for sliding movement radially thereof and cooperating with said vane elements to vary the pitch thereof upon radial movement of said centrifugally responsive elements, and resilient means associated with said centrifugally responsive elements for yieldably opposing radial outward movement of the latter, said resilient means being stressed by cooperation with said centrifugally responsive elements at the center of gravity thereof with a force acting upon the resilient means from the axis of rotation of said disc radially outwardly from said latter axis, and means interconnecting said disc and said propeller blades for varying the pitch thereof responsive to a variation between the rotational speed of the propeller and the rotational speed of said disc.

References Cited in the file of this patent

UNITED STATES PATENTS

| Number | Name | Date |
|---|---|---|
| Re. 18,957 | Gabereau et al. | Sept. 26, 1933 |
| 666,237 | Riotte et al. | Jan. 15, 1901 |
| 1,425,922 | Wesnigk | Aug. 15, 1922 |
| 1,482,690 | Lanzius | Feb. 5, 1924 |
| 1,833,403 | Newton | Nov. 24, 1931 |
| 1,914,346 | Squires | June 13, 1933 |
| 2,021,999 | Hoffman et al. | Nov. 26, 1935 |
| 2,052,454 | Ellwood et al. | Aug. 25, 1936 |
| 2,139,982 | Smith | Dec. 13, 1938 |
| 2,237,030 | Gathman | Apr. 1, 1941 |
| 2,251,602 | Reissner | Aug. 5, 1941 |
| 2,326,308 | Reissner | Aug. 10, 1943 |
| 2,416,541 | Olman | Feb. 25, 1947 |

FOREIGN PATENTS

| Number | Country | Date |
|---|---|---|
| 646,615 | Germany | June 18, 1937 |
| 279,664 | Great Britain | Nov. 3, 1927 |
| 311,472 | Great Britain | May 16, 1929 |
| 353,513 | Italy | Oct. 19, 1937 |